US012627419B2

(12) United States Patent
Bhamri et al.

(10) Patent No.: US 12,627,419 B2
(45) Date of Patent: May 12, 2026

(54) DYNAMIC HARQ-ACK CODEBOOK FOR MULTIPLE PDSCH SCHEDULING BY SINGLE DCI

(71) Applicant: Lenovo (Singapore) Pte. Ltd., New Tech Park (SG)

(72) Inventors: Ankit Bhamri, Rödermark (DE); Alexander Johann Maria Golitschek Edler von Elbwart, Darmstadt (DE); Ali Ramadan Ali, Kraiburg am Inn (DE); Karthikeyan Ganesan, Kronberg im Taunus (DE); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 370 days.

(21) Appl. No.: 18/560,361

(22) PCT Filed: May 10, 2022

(86) PCT No.: PCT/IB2022/054354
§ 371 (c)(1),
(2) Date: Nov. 10, 2023

(87) PCT Pub. No.: WO2022/238912
PCT Pub. Date: Nov. 17, 2022

(65) Prior Publication Data
US 2024/0243855 A1     Jul. 18, 2024

Related U.S. Application Data

(60) Provisional application No. 63/186,712, filed on May 10, 2021.

(51) Int. Cl.
| | |
|---|---|
| *H04L 1/1829* | (2023.01) |
| *H04L 1/1867* | (2023.01) |
| *H04W 72/232* | (2023.01) |

(52) U.S. Cl.
CPC .......... *H04L 1/1854* (2013.01); *H04L 1/1887* (2013.01); *H04W 72/232* (2023.01)

(58) Field of Classification Search
None
See application file for complete search history.

(56) References Cited

U.S. PATENT DOCUMENTS

| | | | | |
|---|---|---|---|---|
| 2013/0242816 A1* | 9/2013 | He | .................... | H04N 21/41407 |
| | | | | 370/280 |
| 2023/0075353 A1* | 3/2023 | Zeng | ................. | H04W 72/0446 |

OTHER PUBLICATIONS

Ericsson, "PDSCH/PUSCH enhancements", 3GPP TSG-RAN WG1 Meeting #104-e Tdoc R1-2101310, Jan. 25-Feb. 5, 2021, pp. 1-27.
(Continued)

*Primary Examiner* — Anh Ngoc M Nguyen
(74) *Attorney, Agent, or Firm* — Kunzler Needham Hilton

(57) ABSTRACT

Apparatuses, methods, and systems are disclosed for HARQ-ACK feedback for multiple downlink transmissions. One method includes receiving receive DCI for scheduling a plurality of downlink transmissions on a plurality of serving cells, wherein downlink transmissions scheduled on a respective serving cell include a set of downlink transmissions scheduled by a single DCI. The method includes determining HARQ-ACK feedback for the plurality of downlink transmissions and determining a sequence of HARQ-ACK bits corresponding to the HARQ-ACK feedback, where the sequence of HARQ-ACK bits is ordered based at least in part on a serving cell index and an occurrence in time of a respective DCI corresponding to the plurality of downlink transmissions. The method includes transmitting the sequence of HARQ-ACK bits.

20 Claims, 12 Drawing Sheets

(56) References Cited

OTHER PUBLICATIONS

PCT/IB2022/054354, "Notification of Transmittal of the International Search Report and the Written Opinion of the International Searching Authority, or the Declaration", International Searching Authority, Aug. 9, 2022, pp. 1-12.

Nokia et al., "On remaining aspects of NR CA/DC", 3GPP TSG-RAN WG1 Meeting NR#90bis R1-1718608, Oct. 9-13, 2017, pp. 1-8.

ZTE, "Remaining Issues of Power Control for NR-DC and Cross-Carrier Scheduling", 3GPP TSG RAN WG1 Meeting #103-e R1-2007736, Oct. 26-Nov. 13, 2020, pp. 1-3.

Apple, "Discussion on HARQ Enhancements for NTN", 3GPP TSG RAN WG1 #104-e R1-2101385, Jan. 25-Feb. 5, 2021, pp. 1-7.

Lenovo et al., "HARQ feedback of SPS PDSCH reception in multi-DCI based multiple TRPs", 3GPP TSG RAN WG1 Meeting #104B-e R1-2102843, Apr. 12-20, 2021, pp. 1-5.

3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.

3GPP, "3rd Generation Partnership Project; Technical Specification Group Radio Access Network; NR; Physical layer procedures for control (Release 16)", 3GPP TS 38.213 V16.5.0, Mar. 2021, pp. 1-183.

3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.

* cited by examiner

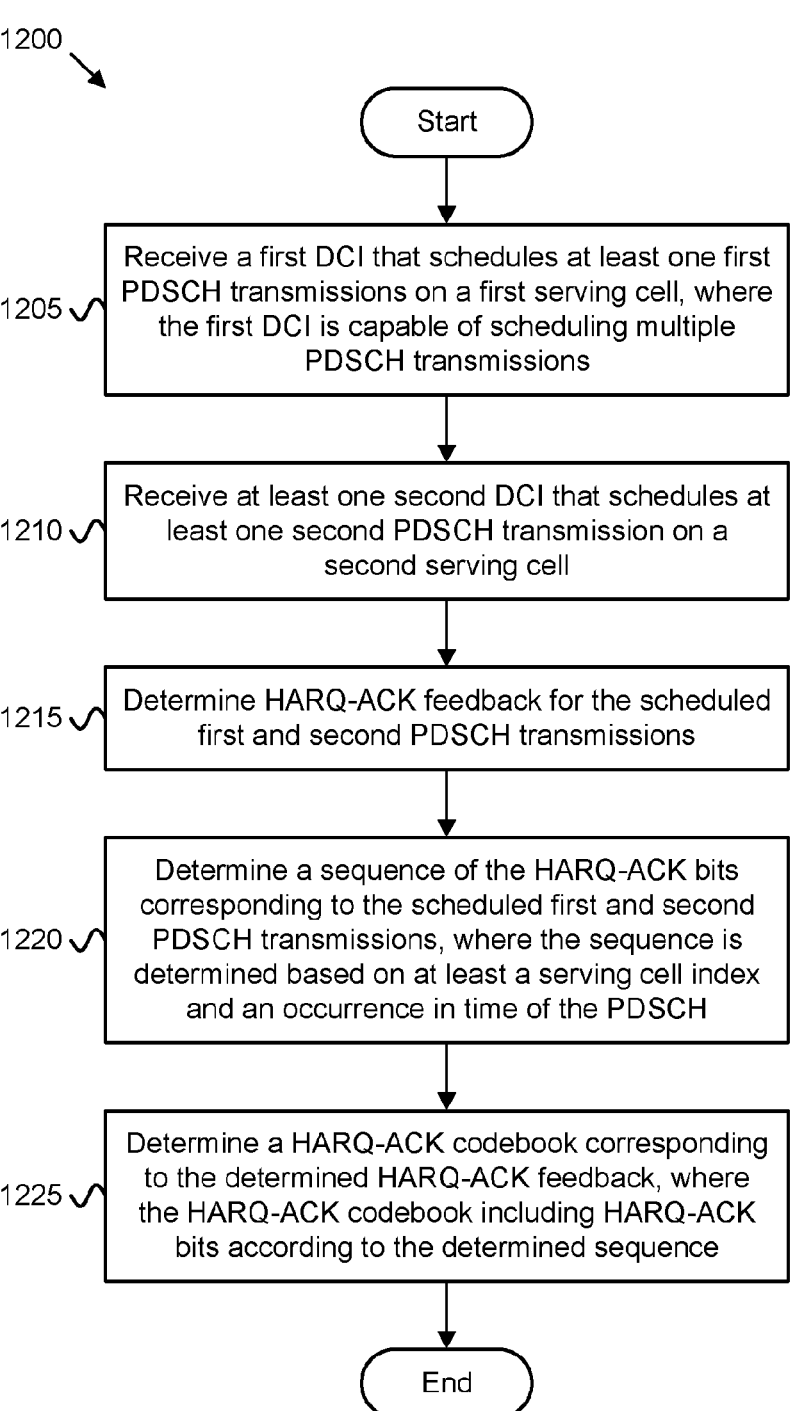

1200

Start

1205 Receive a first DCI that schedules at least one first PDSCH transmissions on a first serving cell, where the first DCI is capable of scheduling multiple PDSCH transmissions 1210 Receive at least one second DCI that schedules at least one second PDSCH transmission on a second serving cell 1215 Determine HARQ-ACK feedback for the scheduled first and second PDSCH transmissions 1220 Determine a sequence of the HARQ-ACK bits corresponding to the scheduled first and second PDSCH transmissions, where the sequence is determined based on at least a serving cell index and an occurrence in time of the PDSCH 1225 Determine a HARQ-ACK codebook corresponding to the determined HARQ-ACK feedback, where the HARQ-ACK codebook including HARQ-ACK bits according to the determined sequence End

FIG. 12

DYNAMIC HARQ-ACK CODEBOOK FOR MULTIPLE PDSCH SCHEDULING BY SINGLE DCI

CROSS-REFERENCE TO RELATED APPLICATIONS

This application claims priority to United States Provisional Patent Application No. 63/186,712 entitled "DYNAMIC HARQ-ACK CODEBOOK FOR MULTIPLE PDSCH SCHEDULING BY SINGLE DCI" and filed on 10 May 2021 for Ankit Bhamri, Alexander Golitschek, Ali Ramadan Ali, Karthikeyan Ganesan, and Sher Ali Cheema, which application is incorporated herein by reference.

FIELD

The subject matter disclosed herein relates generally to wireless communications and more particularly relates to dynamic Hybrid Automatic Repeat Request Acknowledgement ("HARQ-ACK") codebook for multiple Physical Downlink Shared Channel ("PDSCH") scheduling by a single Downlink Control Information ("DCI").

BACKGROUND

In New Radio ("NR") Release 17 ("Rel-17") for NR operation between 52.6-71 GHz, multiple PDSCH scheduling by a single DCI has been agreed for higher Subcarrier Spacing ("SCS") values such as 480 kHz and 960 kHz. One issue that arises because of this enhancement is HARQ-ACK codebook construction. Currently in NR Releases 15 and 16 ("Rel-15/16"), when dynamic HARQ-ACK is applied, then the downlink assignment indicator (including both counter and total Downlink Assignment Indicator ("DAI")) is counter on DCI basis.

BRIEF SUMMARY

Disclosed are procedures for constructing a dynamic HARQ-ACK codebook for multiple PDSCH. Said procedures may be implemented by apparatus, systems, methods, or computer program products.

One method at a User Equipment ("UE") includes receiving a first Downlink Control Information ("DCI") that schedules at least one first Physical Downlink Shared Channel ("PDSCH") transmissions on a first serving cell, where the first DCI is capable of scheduling multiple PDSCH transmissions. The first method includes receiving at least one second DCI that schedules at least one second PDSCH transmission on a second serving cell and determining Hybrid Automatic Repeat Request Acknowledgement ("HARQ-ACK") feedback for the scheduled first and second PDSCH transmissions. The first method includes determining a sequence of the HARQ-ACK bits corresponding to the scheduled first and second PDSCH transmissions and reporting a HARQ-ACK codebook corresponding to the determined HARQ-ACK feedback, where the HARQ-ACK codebook including HARQ-ACK bits according to the determined sequence and the sequence is determined based on at least a serving cell index and an occurrence in time of the PDSCH.

One method at a network device includes transmitting a first DCI that schedules at least one first PDSCH transmissions on a first serving cell, where the first DCI is capable of scheduling multiple PDSCH transmissions. The method includes transmitting at least one second DCI that schedules at least one second PDSCH transmission on a second serving cell and transmitting the scheduled first and second PDSCH transmissions. The method includes receiving a HARQ-ACK codebook including a plurality of HARQ-ACK bits and determining a sequence of the HARQ-ACK bits corresponding to the scheduled first and second PDSCH transmissions, where the determination is based on at least a serving cell index and an occurrence in time of the PDSCH. The method includes determining HARQ-ACK feedback for the scheduled first and second PDSCH transmissions based on the determined sequence.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 12 is a flowchart diagram illustrating one embodiment of a method for constructing a dynamic HARQ-ACK codebook for multiple PDSCH.

DETAILED DESCRIPTION

Figure 1:
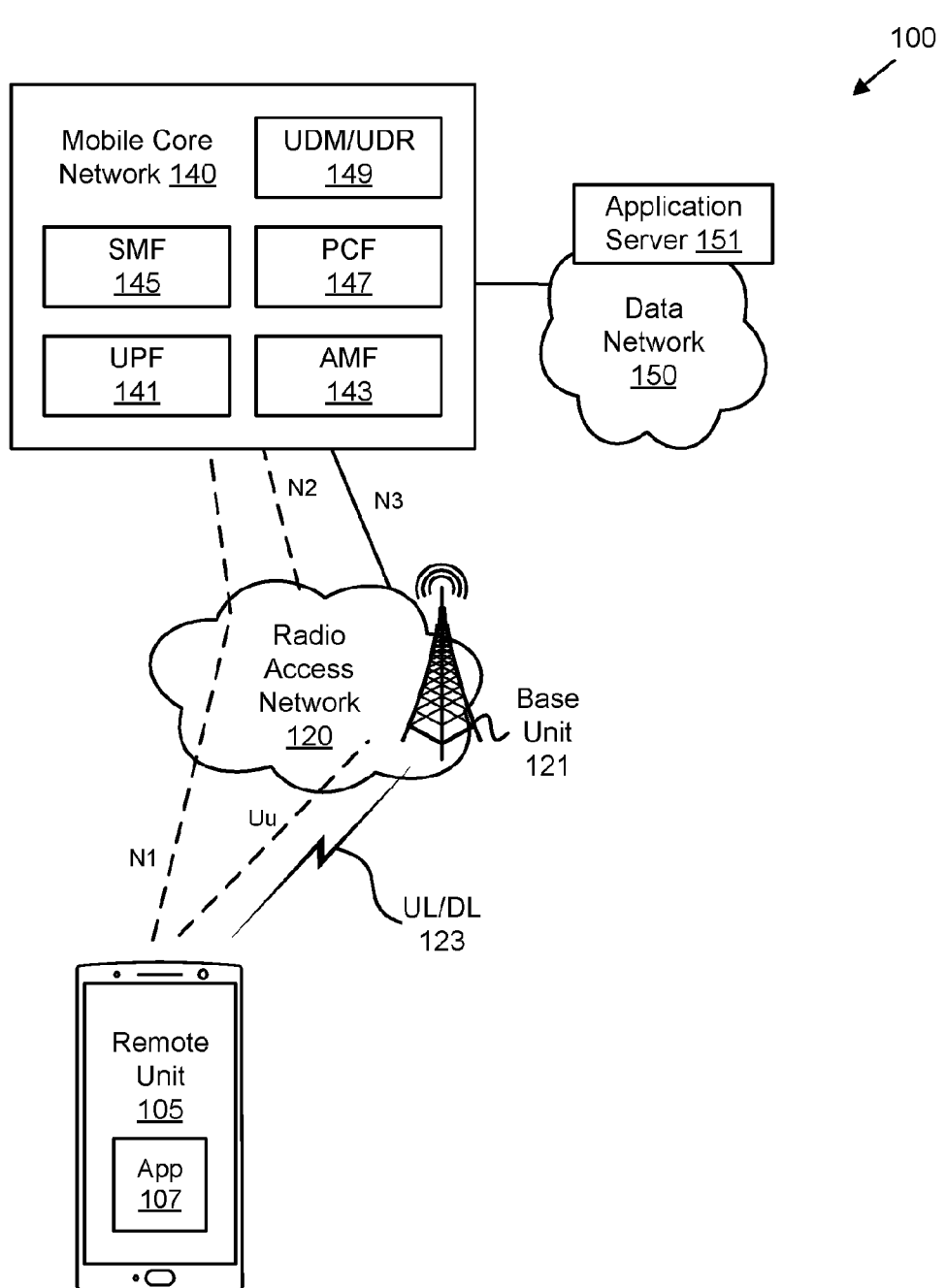
FIG. 1 is a block diagram illustrating one embodiment of a wireless communication system for constructing a dynamic HARQ-ACK codebook for multiple PDSCH.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising," "having," and variations thereof mean "including but not limited to," unless expressly specified otherwise. An enumerated listing of items does not imply that any or all of the items are mutually exclusive, unless expressly specified otherwise. The terms "a." "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for constructing a dynamic HARQ-ACK codebook for multiple PDSCH. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For NR operation between 52.6-71 GHz, multiple PDSCH scheduling by single DCI has been agreed for higher SCS values such as 480 kHz and 960 kHz. One issue that arises because of this enhancement is HARQ-ACK codebook construction. In particular, in this disclosure, we consider the issues related to dynamic (type-2) HARQ-ACK. Currently in NR Rel-15/16, when dynamic HARQ- ACK is applied, then the downlink assignment indicator (including both Counter Downlink Assignment Indicator ("C-DAI") and Total Downlink Assignment Indicator ("T-DAI")) is counted on DCI basis. However, when one DCI can schedule multiple PDSCH transmissions (also referred to as "PDSCHs"), enhancements are needed related to counting of C-DAI, T-DAI, indexing of PDSCHs for HARQ-ACK codebook construction.

For multiple PDSCH scheduling and HARQ-ACK, the wireless networks may support enhancements for multi-PDSCH/PUSCH scheduling and Hybrid Automatic Repeat Request ("HARQ") support with a single DCI. If enhancements are not considered, then based on existing mechanism it will not be clear how many PDSCHs are not received or missed when one of the DCIs is not received (considering that some DCIs might schedule multiple PDSCHs, while some DCI might schedule single PDSCH).

Disclosed are solutions for constructing a dynamic HARQ-ACK codebook for multiple PDSCH. The solutions may be implemented by apparatus, systems, methods, or computer program products. In some embodiments, when multiple PDSCH transmissions can be scheduled by a single DCI, then a device (such as a UE) determines the number of sub-HARQ-ACK codebooks and their construction. In some embodiments, HARQ-ACK sequencing (e.g., PDSCH indexing) is used for dynamic HARQ-ACK codebook construction when multiple PDSCH transmissions are scheduled by a single DCI. In some embodiments, the device performs time-domain bundling of HARQ-ACK bits corresponding to multiple PDSCH transmissions scheduled by a single DCI.

FIG. 1 depicts a wireless communication system 100 for constructing a dynamic HARQ-ACK codebook for multiple PDSCH, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The PDU session represents a logical connection between the remote unit 105 and the User Plane Function ("UPF") 141. The mobile core network 140 then relays traffic between the remote unit 105 and the application server 151 in the packet data network 150 using the PDU session.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for constructing a dynamic HARQ-ACK codebook for multiple PDSCH apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, cNB, Base Station ("BS"), Access Point ("AP"), NR BS, 5G NB, Transmission and Reception Point ("TRP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for constructing a dynamic HARQ-ACK codebook for multiple PDSCH. As used herein, "HARQ-ACK" may represent collectively the Positive Acknowledge ("ACK") and the Negative Acknowledge ("NACK"). ACK means that a Transport Block ("TB") is correctly received while NACK (or NAK) means a TB is erroneously received (or not detected).

Figure 2:
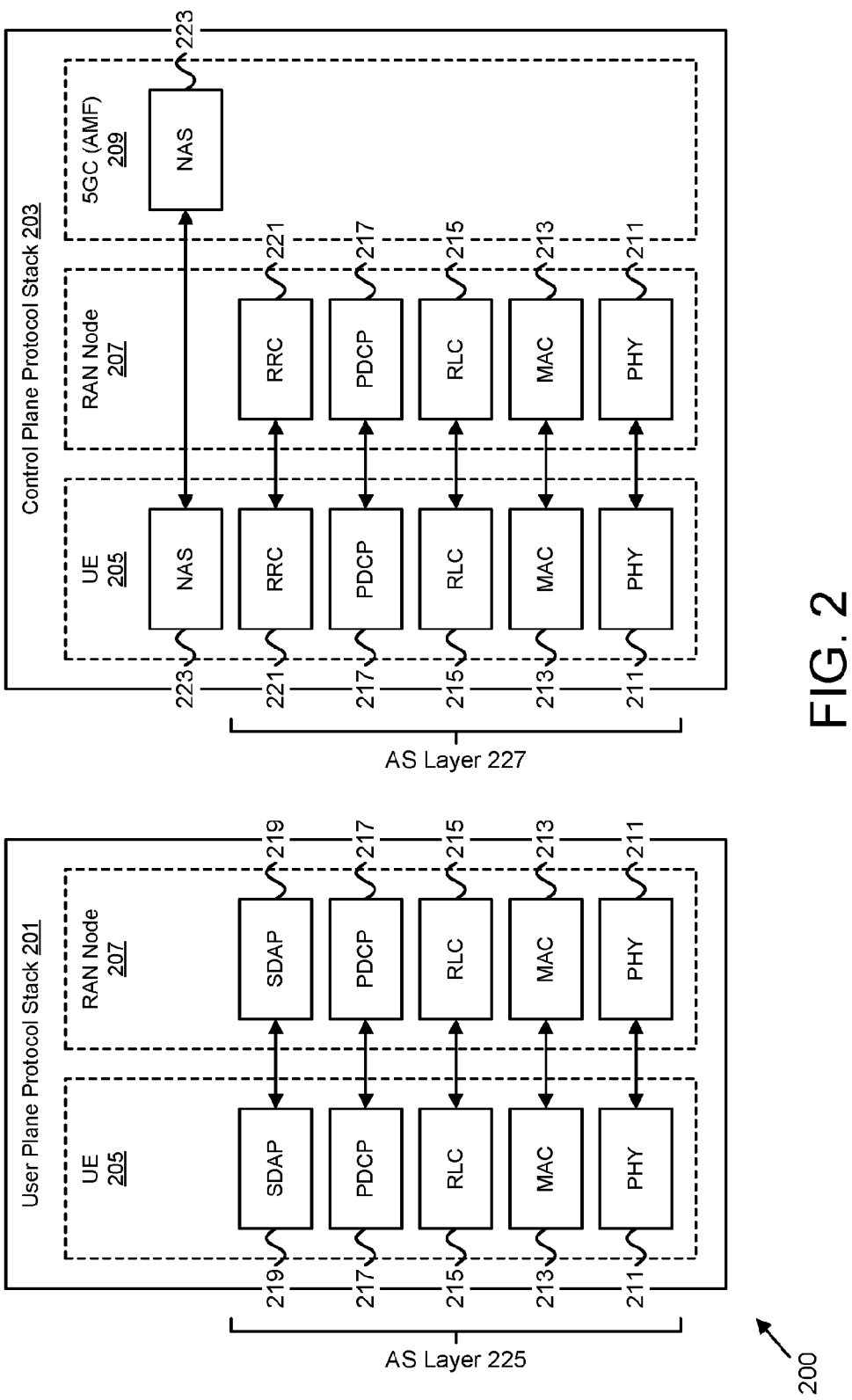
FIG. 2 is a diagram illustrating one embodiment of a New Radio ("NR") protocol stack.

FIG. 2 depicts a protocol stack 200, according to embodiments of the disclosure. While FIG. 2 shows a UE 205, a RAN node 207 (e.g., a gNB) and a 5G core network 209 (containing, e.g., an AMF), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes the physical ("PHY") layer 211, the Medium Access Control ("MAC") sublayer 213, the Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a PHY layer 211, a MAC sublayer 213, a RLC sublayer 215, and a PDCP sublayer 217. The Control Plane protocol stack 203 also includes a Radio Resource Control ("RRC") layer 221 and a Non-Access Stratum ("NAS") layer 223.

The AS layer 225 (also referred to as "AS protocol stack") for the User Plane protocol stack 201 consists of at least the SDAP sublayer 219, PDCP sublayer 217, RLC sublayer 215 and the MAC sublayer 213, and the PHY layer 211. The AS layer 227 for the Control Plane protocol stack 203 consists of at least the RRC sublayer 221, PDCP sublayer 217, RLC sublayer 215, the MAC sublayer 213, and the PHY layer 211. The Layer-1 ("L1") comprises the PHY layer 211. The Layer-2 ("L2") is split into the SDAP sublayer 219, PDCP sublayer 217, RLC sublayer 215, and the MAC sublayer 213. The Layer-3 ("L3") includes the RRC sublayer 221 and the NAS layer 223 for the control plane and includes, e.g., an Internet Protocol ("IP") layer or PDU Layer (not depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 maps QoS flows within a PDU Session to a corresponding Data Radio Bearer over the air interface and the SDAP sublayer 219 interfaces the QoS flows to the 5GC (e.g., to user plane function, UPF). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs"). In certain embodiments, a RRC entity functions for detection of and recovery from radio link failure.

The NAS layer 223 is between the UE 205 and an AMF in the 5GC 509. NAS messages are passed transparently through the RAN. The NAS layer 223 is used to manage the establishment of communication sessions and for maintaining continuous communications with the UE 205 as it moves between different cells of the RAN. In contrast, the AS layers 225 and 227 are between the UE 205 and the RAN (i.e., RAN node 207) and carry information over the wireless portion of the network. While not depicted in FIG. 2, the IP layer exists above the NAS layer 223, a transport layer exists above the IP layer, and an application layer exists above the transport layer.

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the PHY layer 211 through transport channels, which are classified as downlink or uplink. Data is multiplexed into transport channels depending on how it is transmitted over the air.

The PHY layer 211 is responsible for the actual transmission of data and control information via the air interface, i.e., the PHY Layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search and random access (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks etc.

The following relevant details related to downlink assignment indicator ("DAI") for type-2 HARQ-ACK codebook are specified in NR Rel-15/16 at Clause 9.1.3.1 of 3GPP Technical Specification ("TS") 38.213: For Type-2 HARQ-ACK codebook in physical uplink control channel, a UE determines monitoring occasions for PDCCH with DCI format scheduling PDSCH receptions or Semi-Persistent Scheduling ("SPS") PDSCH release or indicating Secondary Cell ("SCell") dormancy on an active DL BWP of a serving cell c (e.g., as described in Clause 10.1 of 3GPP TS 38.213), and for which the UE transmits HARQ-ACK information in a same PUCCH transmission in slot n.

For NR Rel-15/16, the set of PDCCH monitoring occasions is determined based on: A) PDSCH-to-HARQ_feedback timing indicator field values for PUCCH transmission with HARQ-ACK information in slot n in response to PDSCH receptions, SPS PDSCH release or SCell dormancy indication: and B) slot offsets $K_0$ (see 3GPP TS 38.214 for definition) provided by time domain resource assignment field in a DCI format scheduling PDSCH receptions and by parameters pdsch-AggregationFactor, or pdsch-AggregationFactor-r16, or repetitionNumber, when provided.

The set of PDCCH monitoring occasions for a DCI format scheduling PDSCH receptions or SPS PDSCH release or indicating SCell dormancy is defined as the union of PDCCH monitoring occasions across active DL BWPs of configured serving cells. The set of PDCCH monitoring occasions are indexed in an ascending order of start time of the search space sets associated with a PDCCH monitoring occasion. The cardinality of the set of PDCCH monitoring occasions defines a total number M of PDCCH monitoring occasions.

A value of the C-DAI field in DCI formats denotes the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion, First, if the UE indicates by parameter type 2-HARQ-ACK-Codebook support for more than one PDSCH reception on a serving cell that are scheduled from a same PDCCH monitoring occasion, in increasing order of the PDSCH reception starting time for the same {serving cell, PDCCH monitoring occasion} pair, Second in ascending order of serving cell index, and Third in ascending order of PDCCH monitoring occasion index m, where $0 \leq m < M$.

If, for an active DL BWP of a serving cell, the UE is not provided parameter coresetPoolIndex (or is provided the parameter coresetPoolIndex with value of '0') for one or more first CORESETs and is provided the parameter coresetPoolIndex with value '1' for one or more second CORE-SETs, and is provided parameter ackNackFeedbackMode with value 'joint,' then the value of the counter DAI is in the order of: the first CORESETs, and then the second CORE-SETs for a same serving cell index and a same PDCCH monitoring occasion index.

The value of the total DAI ("T-DAI"), when present (see 3GPP TS 38.212), in a DCI format denotes the total number of {serving cell, PDCCH monitoring occasion}-pair(s) in which PDSCH reception(s), SPS PDSCH release or SCell dormancy indication associated with DCI formats is present, up to the current PDCCH monitoring occasion m and is updated from PDCCH monitoring occasion to PDCCH monitoring occasion. If, for an active DL BWP of a serving cell, the UE is not provided coresetPoolIndex or is provided the parameter coresetPoolIndex with value '0' for one or more first CORESETs and is provided the parameter coresetPoolIndex with value '1' for one or more second CORE-SETs, and is provided ackNackFeedbackMode='joint', the total DAI value counts the {serving cell, PDCCH monitoring occasion}-pair(s) for both the first CORESETs and the second CORESETs.

Please note that throughout this disclosure, the scheduling of a single PDSCH transmission (also referred to as "single PDSCH") is assumed for 120 kHz SCS associated with PDSCH and the scheduling of multiple PDSCH transmissions (also referred to as "multiple PDSCHs") is assumed for both 480 kHz SCS and 960 kHz SCS. The maximum number of PDSCH transmissions scheduled for 480 kHz SCS is assumed to be 4 and the maximum number of PDSCH transmissions scheduled for 960 kHz SCS is assumed to be 8. However, different values in terms of maximum number of PDSCH transmissions associated with each of the SCS value can be applicable as well (also other SCS values such as 240 kHz, 1920 kHz, etc.). The embodiments described in this disclosure are primarily considered for dynamic HARQ-ACK codebook. i.e., Type-2 HARQ-ACK codebook but could be applied to other types as well. As indicated above, the presented solutions may apply to DCI that is capable of scheduling multiple PDSCH transmissions, even if in a specific realization such a DCI may be in fact scheduling just a single PDSCH transmission. Therefore, the term "multiple PDSCH scheduling by single DCI" and similar language should be understood in the broad sense to include the case of scheduling a single PDSCH transmission by a DCI capable of scheduling multiple PDSCH transmissions.

According to embodiments of the first solution, when a UE supports multiple PDSCH scheduling by single DCI and single PDSCH scheduling by single DCI, where the maximum number of PDSCH transmissions that can be scheduled by single DCI is associated with the numerology that is applied for those PDSCH transmissions, then the number of HARQ-ACK sub-codebooks is associated with the number of numerologies that are supported by UE. For example, if a UE supports 120 kHz SCS with only single PDSCH scheduling by single DCI. 480 kHz SCS with maximum 4 PDSCH transmissions scheduled by single DCI, and 960 kHz SCS with maximum 8 PDSCH transmissions by single DCI, then at least three HARQ-ACK sub-codebooks can be constructed associated with 120 kHz SCS (having a maximum of one PDSCH). 480 kHz SCS (having a maximum of four PDSCH transmissions) and 960 SCS kHz (having a maximum of eight PDSCH transmissions), respectively. For the case that HARQ-ACK feedback is determined/transmitted per Transport Block ("TB"), such a HARQ-ACK sub-codebook can be referred to as a TB-level HARQ-ACK sub-codebook.

In addition, if Code Block Group ("CBG") based transmissions are associated with one or more of the numerologies, then a CBG-level HARQ-ACK sub-codebook may be constructed for each such numerology. For example, for CBG-based transmissions with SCS of 120 kHz only, but TB-based transmissions only with SCS of 480 kHz and 960 kHz, a plurality of HARQ-ACK sub-codebooks can be constructed, where two CBG-level HARQ-ACK sub-codebooks are associated with the 120 kHz SCS and one TB-level HARQ-ACK sub-codebook for each of the 480 kHz SCS and 960 kHz SCS, respectively. Note that in 3GPP NR, a TB may be split into multiple CBGs. In various embodiments, a CBG may be composed of multiple code blocks ("CBs"). In one example, one TB is made up of multiple CBG and one CBG is usually made up of multiple CBs. In other embodiments, a TB may be composed of a single CBG and/or a CBG may be composed of a single CB.

All the HARQ-ACK sub-codebooks are concatenated in order of increasing SCS value (or alternatively in order of increasing number of maximum PDSCH transmissions scheduled by single DCI), or in decreasing order respectively. The HARQ-ACK sub-codebook associated with the second CBG for 120 kHz SCS is appended after the sub HARQ-ACK sub-codebook associated with first CBGs for all SCSs. Note that the TB-based transmission on 480 kHz SCS and 960 kHz SCS are considered to have only a single (first) CBG. Therefore, the concatenated codebook will be constructed as "sub-codebook1-1+sub-codebook2+sub-codebook 3+sub-codebook1-2".

In an alternate implementation of the first solution, the concatenation is "sub-codebook 1-1+sub-codebook1-2+sub-codebook2+sub-codebook3" i.e., all HARQ-ACK sub-codebooks associated for the same SCS value are concatenated first, before concatenating HARQ-ACK sub-codebooks associated with other SCS value.

Figure 3:
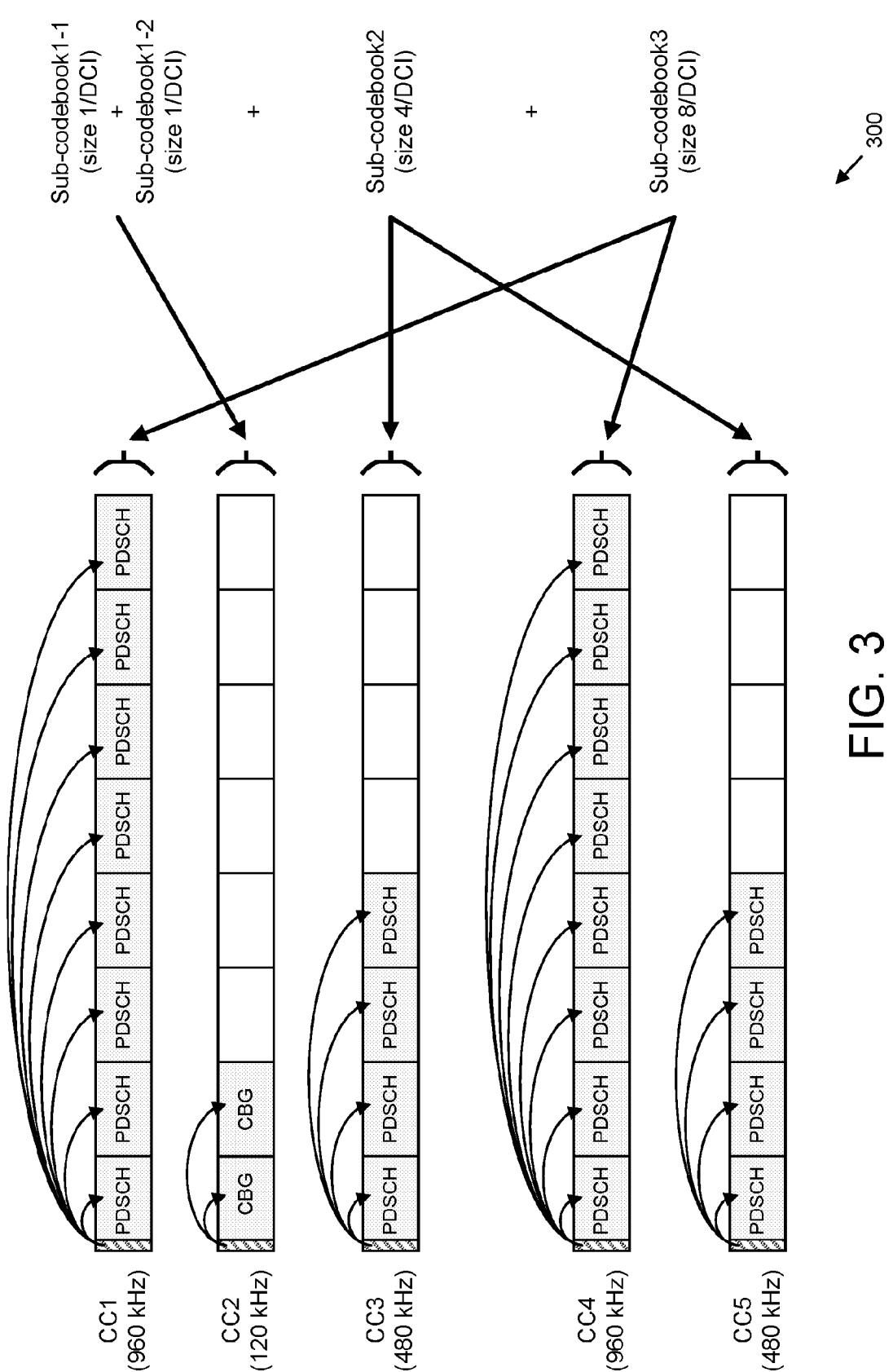
FIG. 3 is a diagram illustrating one embodiment of multiple HARQ-ACK sub-codebooks for multiple PDSCHs by single DCI.

FIG. 3 depicts an exemplary implementation 300 of multiple HARQ-ACK sub-codebooks for multiple PDSCH transmissions scheduled by single DCI having different SCS values associated with different sub-codebooks, according to embodiments of the disclosure. In the implementation 300, the UE has PDCCH monitoring occasions to receive single and/or multiple PDSCH scheduling for 5 CCs, where CC1 is monitored for PDCCH scheduling up to 8 PDSCH transmissions with 960 kHz SCS, where CC2 is monitored for PDCCH scheduling a maximum of 1 PDSCH transmission—including CBG transmission—with 120 kHz SCS, where CC3 is monitored for PDCCH scheduling up to 4 PDSCH transmissions with 480 kHz SCS, CC4 is monitored for PDCCH scheduling up to 8 PDSCH transmissions with 960 kHz SCS, and where CC5 is monitored for PDCCH scheduling up to 4 PDSCH transmissions with 480 kHz SCS. In the depicted embodiments, it is assumed that the UE receives a first DCI that schedules 8 consecutive PDSCH transmissions for CC1, a second DCI that schedules 1 PDSCH (comprising two CBG) for CC2, a third DCI that schedules 4 consecutive PDSCH transmissions for CC3, a fourth DCI that schedules 8 consecutive PDSCH transmissions for CC4, and a fifth DCI that schedules 4 consecutive PDSCH transmissions for CC5.

The UE receives (or attempts to receive) and attempts to decode the scheduled PDSCH transmissions on CC1, CC2, CC3, CC4, and CC5. In the depicted embodiment, two HARQ-ACK sub-codebooks are constructed for 120 kHz (sub-codebook1-1 for CBG-1 and sub-codebook 1-2 for CBG-2), 1 HARQ-ACK sub-codebook is constructed for 480 kHz (sub-codebook2) and 1 HARQ-ACK sub-codebook is constructed for 960 kHz (sub-codebook2).

Additionally, the UE determines the sequence of HARQ-ACK bits for the scheduled PDSCH transmissions. In one embodiment, the HARQ-ACK sub-codebooks are concatenated in order of increasing SCS. The UE generates a (i.e., concatenated) HARQ-ACK codebook with HARQ-ACK bits for the PDSCH transmissions and reports the HARQ-ACK codebook to the RAN.

In some embodiments of the first solution, separate HARQ-ACK sub-codebook is not applied for each of the SCS (maximum number of PDSCH transmissions), if PDSCH grouping is applied such that the codebook size for two different SCS associated with two different maximum number of PDSCH transmissions (scheduling by single DCI) are aligned.

Figure 4:
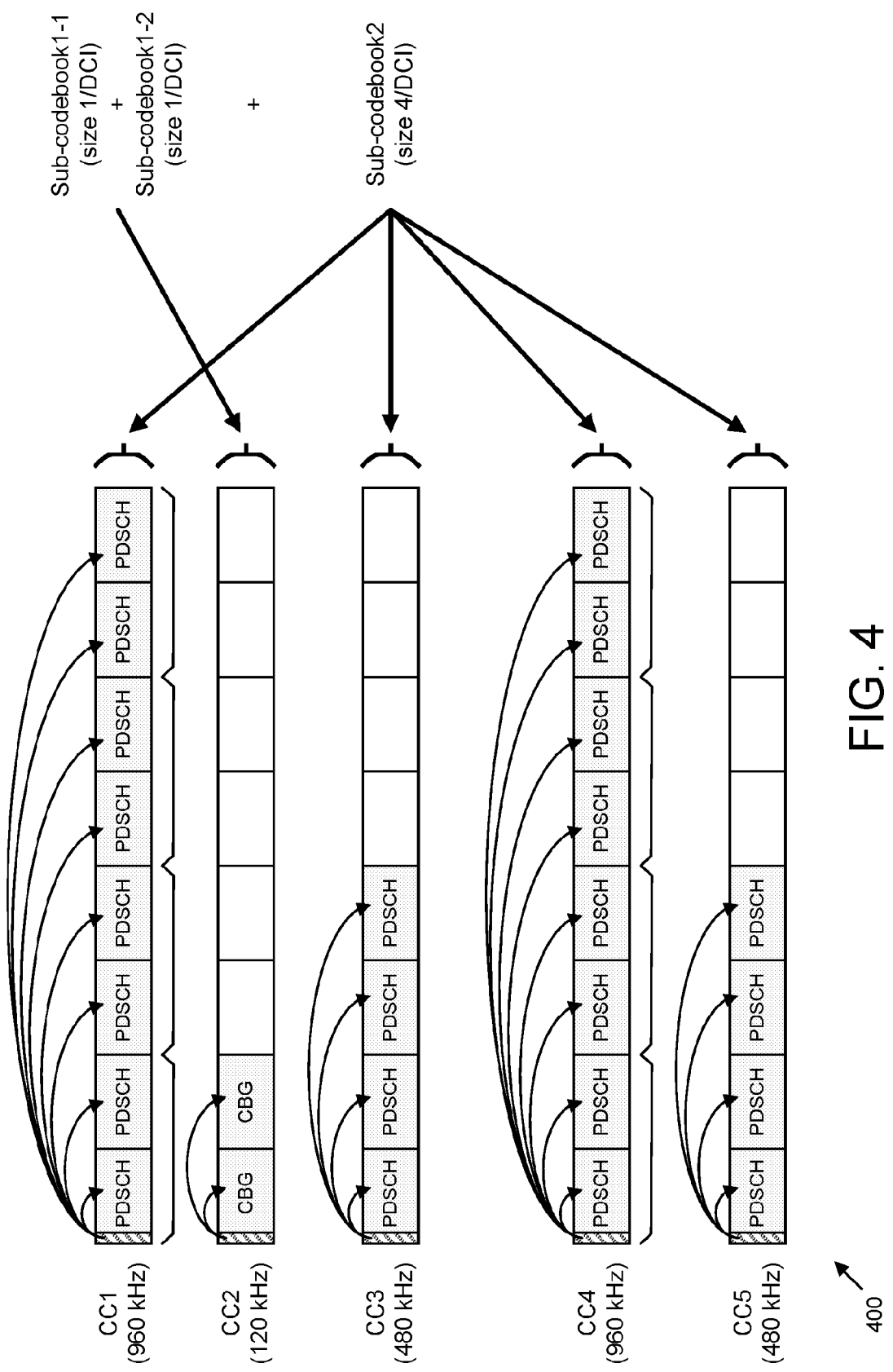
FIG. 4 is a diagram illustrating another embodiment of multiple HARQ-ACK sub-codebooks for multiple PDSCHs by single DCI.

FIG. 4 depicts an exemplary implementation 400 of multiple HARQ-ACK sub-codebooks for multiple PDSCH transmissions scheduled by single DCI having different SCS associated with the same sub-codebook, according to embodiments of the disclosure. In the implementation 400, the UE has PDCCH monitoring occasions to receive single and/or multiple PDSCH scheduling for on 5 CCs, where CC1 is monitored for PDCCH scheduling up to 8 PDSCH transmissions with 960 kHz SCS, where CC2 is monitored for PDCCH scheduling a maximum of 1 PDSCH transmission—including CBG transmission—with 120 kHz SCS, where CC3 is monitored for PDCCH scheduling up to 4 PDSCH transmissions with 480 kHz SCS, CC4 is monitored for PDCCH scheduling up to 8 PDSCH transmissions with 960 kHz SCS, and where CC5 is monitored for PDCCH scheduling up to 4 PDSCH transmissions with 480 kHz SCS. In the depicted embodiments, it is assumed that the UE receives a first DCI that schedules 8 consecutive PDSCH transmissions for CC1, a second DCI that schedules 1 PDSCH (comprising two CBG) for CC2, a third DCI that schedules 4 consecutive PDSCH transmissions for CC3, a fourth DCI that schedules 8 consecutive PDSCH transmissions for CC4, and a fifth DCI that schedules 4 consecutive PDSCH transmissions for CC5.

The UE receives (or attempts to receive) and attempts to decode the scheduled PDSCH transmissions on CC1, CC2, CC3, CC4, and CC5. In the depicted embodiment, two HARQ-ACK sub-codebooks are constructed for 120 kHz SCS (i.e., sub-codebook1-1 and sub-codebook 1-2), but one single HARQ-ACK sub-codebook is constructed for both 480 kHz SCS and 960 kHz SCS (i.e., sub-codebook2).

Additionally, the UE determines the sequence of HARQ-ACK bits for the scheduled PDSCH transmissions. In one embodiment, the HARQ-ACK sub-codebooks are concatenated in order of increasing SCS. The UE generates a (i.e., concatenated) HARQ-ACK codebook with HARQ-ACK bits for the PDSCH transmissions and reports the HARQ-ACK codebook to the RAN.

PDSCH grouping is applied to 960 kHz SCS such that codebook size for this becomes equal to that of 480 kHz SCS. Since maximum 4 PDSCH transmissions can be scheduled for 480 kHz SCS, therefore the codebook size is 4 (for one TB) and consequently in order to have the codebook size of 4 associated with 960 kHz SCS, two consecutive PDSCH transmissions are grouped together, and corresponding HARQ-ACK bits are time bundled across those two consecutive PDSCH transmissions. Similarly, if no HARQ-ACK sub-codebook is needed between single PDSCH scheduling (120 kHz SCS) and multiple PDSCH scheduling (480 kHz SCS and 960 kHz SCS), then a grouping of 4 PDSCH transmissions can be associated with 480 kHz SCS (assuming maximum 4 PDSCH transmissions are scheduled for 480 kHz SCS) and a grouping of 8 PDSCH transmissions can be associated with 960 kHz SCS (assuming maximum 8 PDSCH transmissions are scheduled for 960 kHz SCS).

The concatenation approach is likewise applicable for any number of serving cells or component carriers ("CCs") associated with different subcarrier spacings and is not restricted to the case of 5, which is used in FIG. 4 just as a means to exemplify the approach. It should be understood that an SCS can be associated with a bandwidth part ("BWP") rather than a component carrier, so that the concatenation approach is equally applicable to different BWPs.

Likewise, the concatenation approach is not restricted to self-scheduling of each CC (or BWP, resp.), i.e., where PDSCH resource(s) are scheduled by a DCI transmitted on the same CC/BWP as the PDSCH resource, but also is applicable to cross-carrier scheduling. i.e., where PDSCH resource(s) are scheduled by a DCI transmitted on a different CC/BWP from the PDSCH resource. In this aspect, the SCS in question (with respect to the concatenation) is associated with the SCS of the CC/BWP of the scheduled PDSCH resource(s), not with the SCS associated with the CC/BWP where the DCI for scheduling the PDSCH resource(s) is transmitted.

In some embodiments of the first solution, the number of HARQ-ACK sub-codebooks are determined by the number of SCS the UE is configured/capable and/or the DCI formats that the UE is required to monitor. In alternate embodiments of the first solution, the number of HARQ-ACK sub-codebooks are indicated to the UE via DCI and/or semi-static configuration.

In some embodiments of the first solution, UE can be configured and/or indicated whether same codebook is applied for all multiple PDSCH transmissions scheduling DCI (where the size can be aligned by means of time-domain bundling or addition of NACK bits) or different sub HARQ ACK codebooks need to be constructed corresponding to the DCI that can schedule different number of maximum PDSCH transmissions.

In some embodiments of the first solution, when a UE is configured to monitor a same DCI can be used to schedule either a single PDSCH transmission or multiple PDSCH transmissions and if the UE misses the DCI, then the number of NACKs to be added is based on maximum number of PDSCH transmissions that can be scheduled by DCI. In this case, if the DAI is counted per DCI, then the counter is incremented only by one, even if multiple PDSCH transmissions could have been scheduled and if the DAI is counted per PDSCH, then the counter is incremented by the number equal to the maximum number of PDSCH transmissions that can be scheduled by single DCI.

In alternate embodiments of the first solution, when a UE is configured to monitor a same DCI can be used to schedule either a single PDSCH or multiple PDSCH and if the UE misses the DCI, then the number of NACKs to be added is equal to 1. In this case, if the DAI is counted per DCI, then the counter is incremented only by 1, even if multiple PDSCH transmissions could have been scheduled and if the DAI is counted per PDSCH, then the counter is incremented by the number equal to the maximum number of PDSCH transmissions that can be scheduled by single DCI.

In some embodiments of the first solution, for example when a UE is configured to monitor a same DCI can be used to schedule either a single PDSCH or multiple PDSCH (but not limited to this example), then two separate DAI fields can be present in the DCI. One DAI field is corresponding to single PDSCH scheduling, while the other DAI field is corresponding multiple PDSCH scheduling.

In some embodiments of the first solution, two DAI fields are present in DCI, where one DAI field is counted per DCI and the other DAI field is counted per PDSCH. In this case, if a DCI monitoring occasion is missed by UE, then the one DAI field is incremented by 1, but the other DAI field is incremented by either maximum number of PDSCHs that can be scheduled or the actual number of PDSCH transmissions that were scheduled by the missed DCI.

According to embodiments of the second solution, when multiple PDSCH transmissions can be scheduled by single DCI, then a HARQ-ACK codebook is constructed in a sequence of PDSCH transmissions, where the sequence/order of HARQ-ACK bits in the codebook is determined based on at least a serving cell (or CC) index and an occurrence in time of the PDSCH transmissions.

In one implementation of the second solution, when multiple PDSCH transmissions can be scheduled by single DCI, then a HARQ-ACK codebook is constructed in a sequence of PDSCH transmissions occurring first across all the CCs (serving cells) for a given slot (transmission time interval) and followed by PDSCH transmissions in the following slots (TTIs) that might have been scheduled as multiple PDSCH by single DCI.

Figure 5:
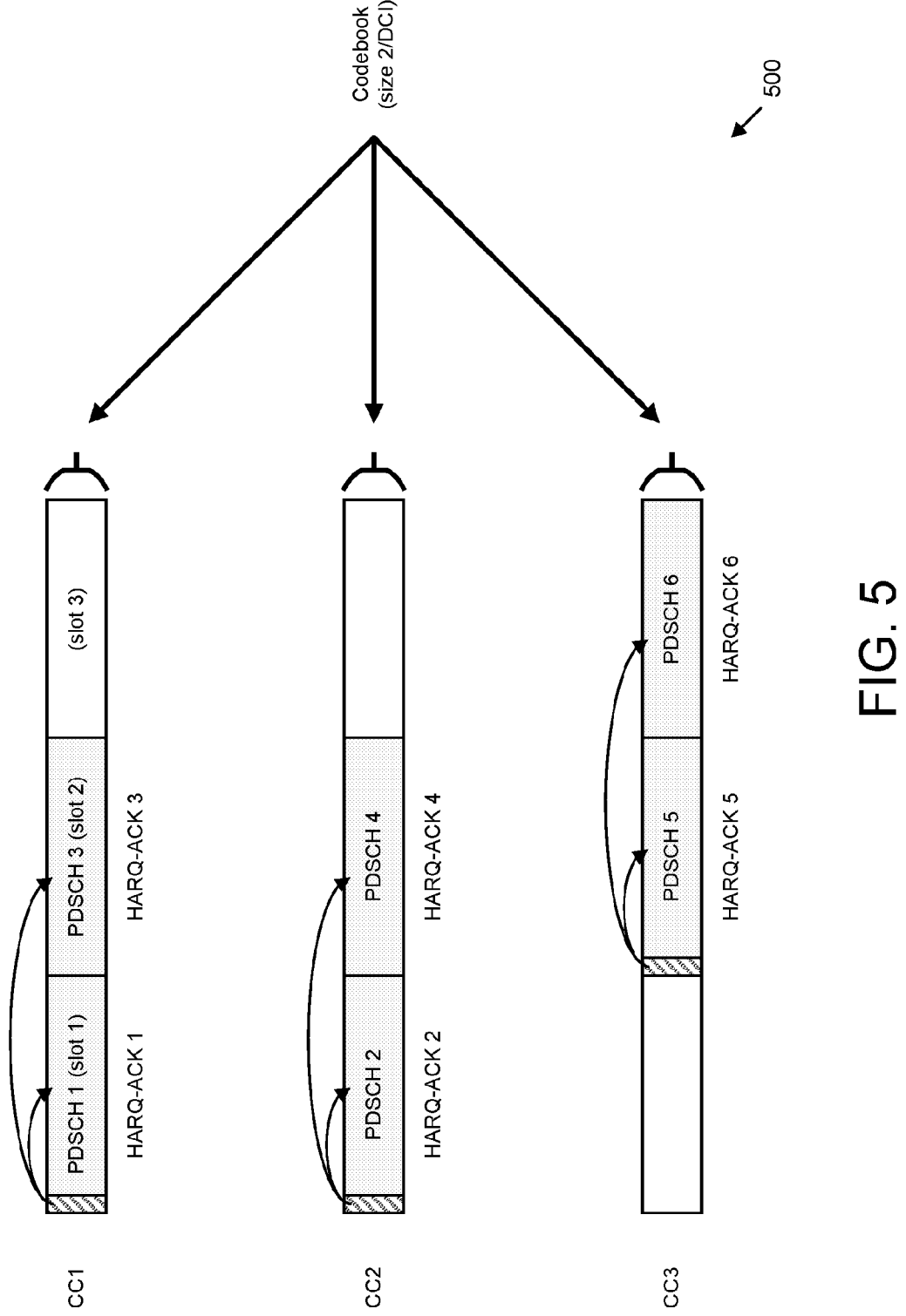
FIG. 5 is a diagram illustrating one embodiment of HARQ-ACK codebook construction for single HARQ-ACK codebook scheduled for multiple PDSCHs scheduled by single DCI.

FIG. 5 depicts an exemplary implementation 500 of HARQ-ACK codebook construction (i.e., PDSCH indexing) at a UE for single HARQ-ACK codebook scheduled for multiple PDSCH transmissions scheduled by single DCI, according to embodiments of the disclosure. In the implementation 500, there are 3 CCs (denoted "CC1," "CC2," and "CC3," respectively) and CC1 is scheduled with 2 PDSCH transmissions by one DCI received on CC1 in slot 1 and CC2 is scheduled with 2 PDSCH transmissions by one DCI received on CC2 in slot 1. Furthermore, CC3 is also scheduled with 2 PDSCH transmissions by one DCI received on CC3 in slot 2.

As illustrated, in the implementation 500 the PDSCH transmissions are indexed first in order of CCs having PDSCH transmissions in slot 1 (i.e., CC1 and CC2), followed by CCs having PDSCH transmissions in slot 2 (i.e., CC1, CC2, and CC3), and so on. In this example, same size single codebook is assumed for all CCs because the maximum number of PDSCH transmissions scheduled by single DCI is 2. When multiple CCs have PDSCH transmissions scheduled for the same slot, then the PDSCH indexing for that slot may be in order from lowest CC index to highest CC index. Corresponding to the PDSCH indexing, HARQ-ACK bits corresponding to the PDSCH transmissions are added to generate the codebook.

In another implementation of the second solution, multiple HARQ-ACK sub-codebooks are constructed that are associated with different SCS (alternatively with DCI scheduling different number of maximum PDSCH transmissions). The indexing of PDSCH transmissions and corresponding HARQ-ACK construction is independent for each codebook, where each HARQ-ACK sub-codebook is constructed in a sequence of PDSCH transmissions occurring first across all the CCs (serving cells) for a given slot (or transmission time interval ("TTI")) and followed by PDSCH transmissions in the following slots (or TTIs) that might have been scheduled as multiple PDSCH by single DCI.

Figure 6:
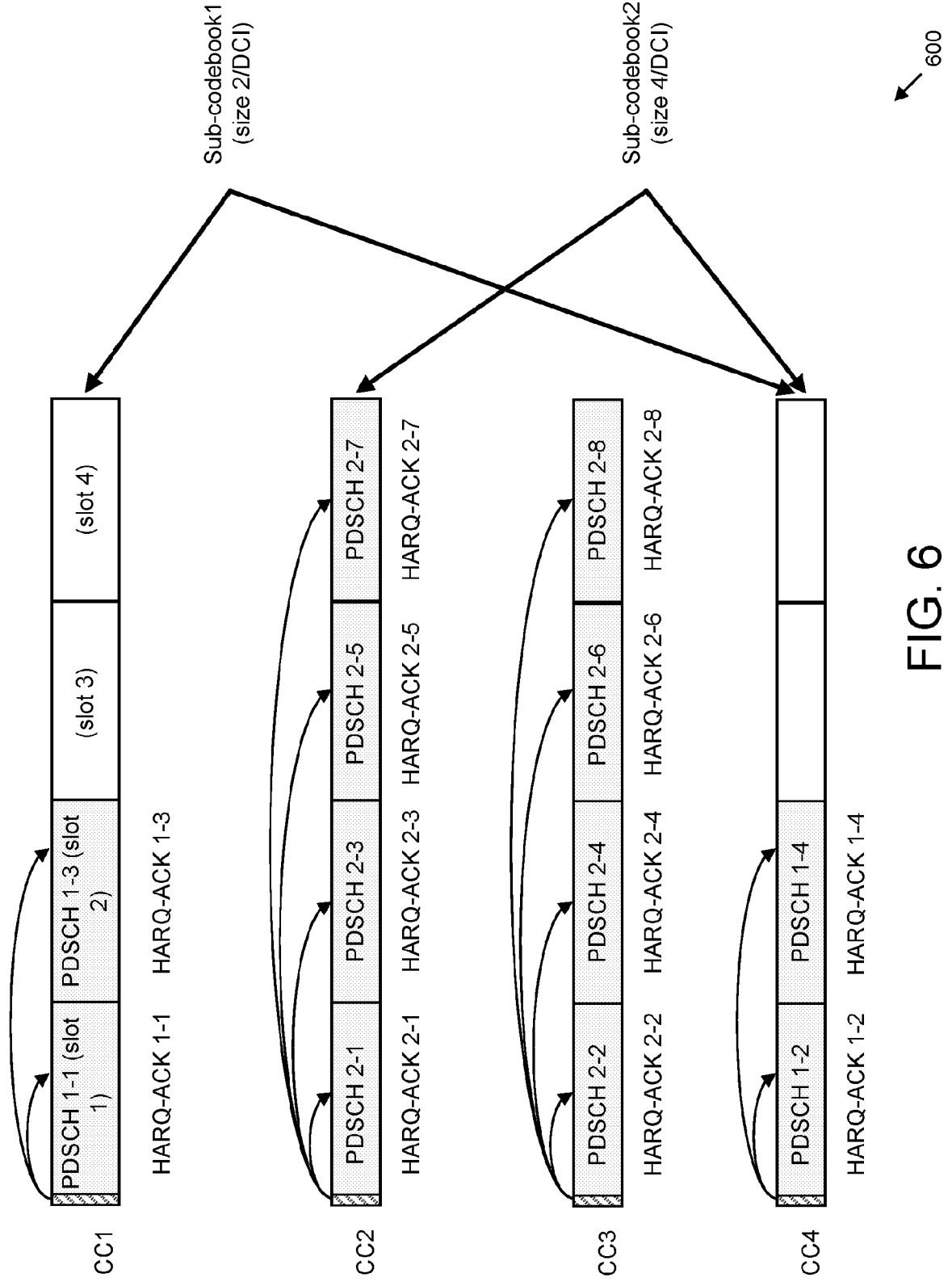
FIG. 6 is a diagram illustrating one embodiment of HARQ-ACK codebook construction for multiple HARQ-ACK sub-codebooks corresponding to two DCI that schedule different number of PDSCHs.

FIG. 6 depicts an exemplary implementation 600 of HARQ-ACK codebook construction (i.e., PDSCH indexing) at a UE for multiple HARQ-ACK sub-codebooks corresponding to two DCI that schedule different number of PDSCH transmissions, according to embodiments of the disclosure. In the implementation 600, there are 4 CCs (denoted "CC1," "CC2," "CC3," and "CC4," respectively) where CC1 is scheduled with 2 PDSCH transmissions by one DCI received on CC1 in slot 1, CC2 is scheduled with 4 PDSCH transmissions by one DCI received on CC2 in slot 1, CC3 is scheduled with 4 PDSCH transmissions by one DCI received on CC3 in slot 1 and CC4 is scheduled with 2 PDSCH transmissions by one DCI received on CC4 in slot 1.

As explained above in the embodiments of the first solution, multiple sub-codebooks are used because the maximum number of PDSCH transmissions scheduled by single DCI differs among the various CCs. In the implementation 600, two HARQ-ACK sub-codebooks are constructed, where a first sub-codebook is associated with PDSCH transmissions scheduled on CC1 and CC4, and a second sub-codebook is associated with PDSCH transmissions scheduled on CC2 and CC3. For each HARQ-ACK sub-codebook, when multiple CCs have PDSCH transmissions scheduled for the same slot, then the PDSCH indexing for that slot may be in order from lowest CC index to highest CC index. Corresponding to the PDSCH indexing, HARQ-ACK bits corresponding to the PDSCH transmissions are added to generate the sub-codebook.

In some embodiments of the second solution, the HARQ-ACK codebook size (or sub-codebook size) is fixed according to the maximum number of PDSCH transmissions that can be scheduled by single DCI. For example, if two different HARQ-ACK sub-codebooks are applied for 480 kHz SCS, where a single DCI can schedule up to 4 PDSCH transmissions, and for 980 kHz SCS, where a single DCI can schedule up to 8 PDSCH transmissions, then the corresponding HARQ-ACK sub-codebook size is 4 (for one TB/PDSCH) and 8 (for one TB/PDSCH), respectively.

In alternate embodiments of the second solution, a same single HARQ-ACK sub-codebook is applied for different SCS such as 480 kHz and 960 kHz. In such embodiments, an additional 4 (virtual) PDSCH transmissions can be assumed for 480 kHz SCS, and NACK is reported correspondingly for them. In other words, the HARQ-ACK sub-codebook for the CC(s) with smaller SCS values can be expanded by assuming a virtual PDSCH transmission (i.e., a fictious PDSCH transmission where it is known by both sender (network) and receiver (UE) that no such transmission is actually made) for each actual PDSCH transmission (i.e., where a real transmission is made), where NACK is reported for each virtual PDSCH transmission. The expanded sub-codebook is then the same size as the HARQ-ACK sub-codebook for the CC(s) with larger SCS values and the two sub-codebooks can be merged into a single HARQ-ACK (sub-) codebook.

When the same single HARQ-ACK sub-codebook is applied for different SCS values, then the sequence of HARQ-ACK bits (indexing of PDSCH) can be done as described in above embodiments/implementations taking virtual PDSCH transmissions into account. In some implementations of the second solution, even for a single SCS value, such as 480 kHz, although maximum 4 PDSCH transmissions can be scheduled by single DCI, but actually a smaller number of PDSCH transmissions such as two are scheduled, then assumption of 2 additional (virtual) PDSCH transmissions can be applied as well and similar methods as above could be applied for determining the PDSCH indexing for HARQ-ACK codebook construction.

In one implementation of the second solution, where additional PDSCH transmissions are assumed (i.e., virtual PDSCH transmissions) to align with maximum PDSCH transmissions and corresponding HARQ-ACK codebook size and if additional PDSCH transmissions are scheduled by a DCI received in later slots such that the actual scheduled PDSCH transmissions overlap in time (and on same CC) with the additional (virtual) assumed PDSCH, then the PDSCH indexing for the HARQ-ACK codebook is expanded to account for both the first DCI and the later received DCI.

Figure 7:
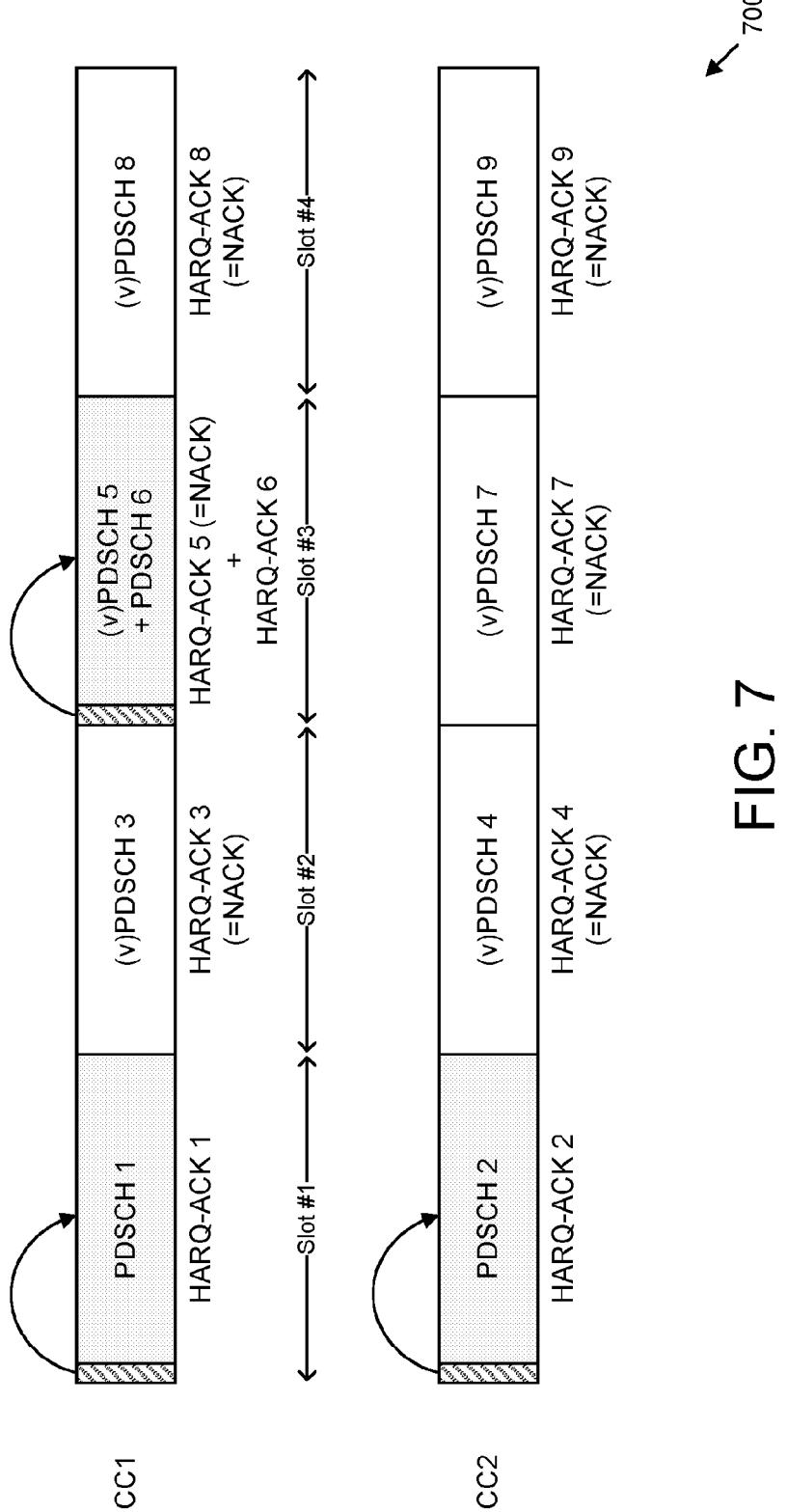
FIG. 7 is a diagram illustrating one embodiment of HARQ-ACK codebook construction for overlap between actual and virtual assumed PDSCHs in same slot and same Component Carrier ("CC")

FIG. 7 depicts an exemplary implementation 500 of HARQ-ACK codebook construction (i.e., PDSCH indexing) at a UE for overlap between actual and virtually assumed PDSCH transmissions in same slot and same CC, for single HARQ-ACK codebook when multiple PDSCH transmissions scheduled by single DCI, according to embodiments of the disclosure. In the implementation 700, there are 2 CCs (denoted "CC1" and "CC2," respectively). CC1 is scheduled with 1 PDSCH transmission by a one DCI received on CC1 in slot 1 and CC2 is also scheduled with 1 PDSCH transmission by another DCI received on CC2 in slot 1. In the depicted embodiment, the UE assumes additional (i.e., virtual) PDSCH transmissions to align with maximum PDSCH transmissions, as discussed above.

As depicted, an actual PDSCH transmission is scheduled for CC1 at slot 1 and virtual PDSCH transmissions are assumed for CC1 at slots 2, 3, and 4. Similarly, for CC2 an actual PDSCH transmission is scheduled at slot 1 and virtual PDSCH transmissions are assumed at slots 2, 3, and 4. However, the CC1 is also scheduled with 1 PDSCH transmission by a further DCI received on CC1 in slot 3, thereby causing an overlap in time of the same CC.

As shown in FIG. 7, in the case of overlap between the actual PDSCH transmission (i.e., scheduled by the later DCI) and the virtual PDSCH transmission (i.e., scheduled by the earlier DCI), the PDSCH indexing also considers the time the scheduling DCI was received. Therefore, the virtual PDSCH transmission (i.e., scheduled by earlier DCI) gets a lower index and the actual PDSCH transmission (i.e., scheduled by later DCI) gets a higher index. Basically, in case of overlap of two PDSCH transmissions on a slot in same CC (assuming same codebook applies to both), the indexing is always done based on the sequence of DCI that were received corresponding to those PDSCH transmissions.

Figure 8:
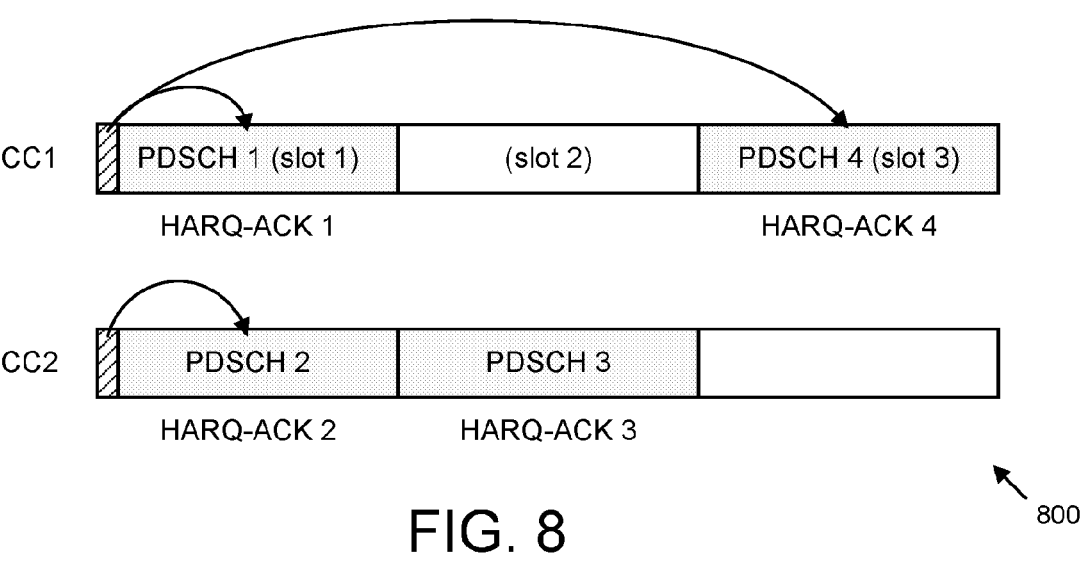
FIG. 8 is a diagram illustrating one embodiment of HARQ-ACK codebook construction with non-contiguous multiple PDSCHs scheduling and PDSCH indexing.

FIG. 8 depicts an exemplary implementation 800 of HARQ-ACK codebook construction (i.e., PDSCH indexing) at a UE, where non-contiguous multiple PDSCH transmissions are scheduled by single DCI on at least one CC and contiguous PDSCH transmissions are scheduled by single DCI on at least one other CC. In FIG. 8, two CCs are scheduled (denoted "CC1" and "CC2"), where CC1 is scheduled with 2 non-contiguous PDSCH transmissions in slot 1 and slot 3 and CC2 is scheduled with 2 contiguous PDSCH transmissions in slot 1 and slot 2. In the depicted embodiment, the PDSCH indexing and corresponding HARQ-ACK sequencing is done first for PDSCH transmissions scheduled across all CCs in slot 1, followed by PDSCH transmissions in later slot.

In alternate embodiments, the PDSCH indexing is done first in order of multiple PDSCH transmissions scheduled by a single DCI on a CC, followed by PDSCH transmissions scheduled on another CC in same slot. Such implementation is beneficial when no separate HARQ-ACK codebooks are assumed corresponding to different SCS (alternatively different number of maximum PDSCH transmissions scheduled by single DCI). Also, it might be more beneficial to avoid any ambiguity for PDSCH indexing (HARQ-ACK codebook construction) when non-contiguous PDSCH transmissions can be scheduled by a single DCI.

Figure 9:
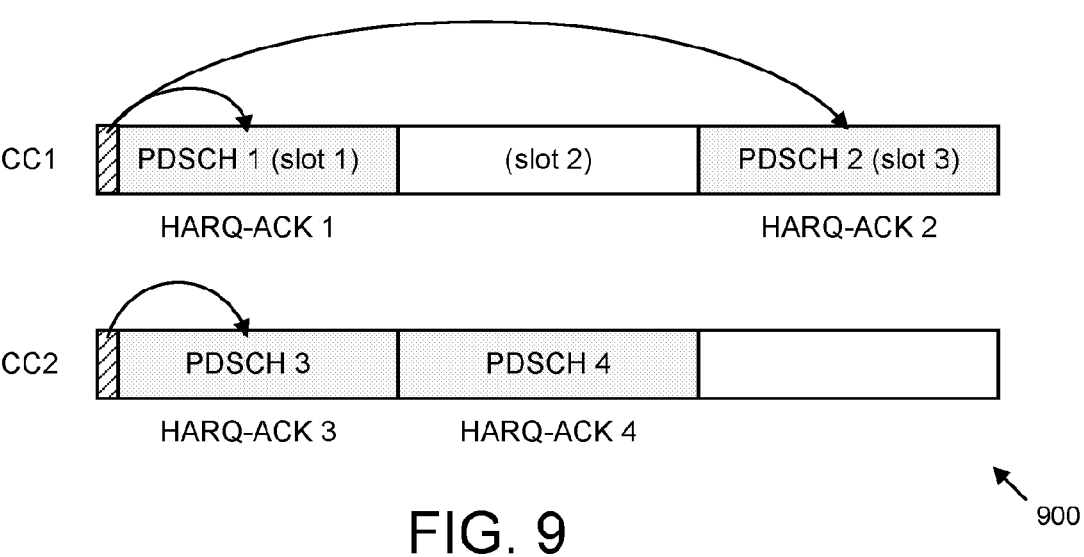
FIG. 9 is a diagram illustrating another embodiment of HARQ-ACK codebook construction with non-contiguous multiple PDSCHs scheduling and PDSCH indexing.

FIG. 9 depicts an exemplary implementation 900 of HARQ-ACK codebook construction (i.e., PDSCH indexing) at a UE, where non-contiguous multiple PDSCH transmissions are scheduled by single DCI on at least one CC and contiguous PDSCH transmissions are scheduled by single DCI on at least one other CC. In the implementation 900. HARQ-ACK sequencing is performed first with PDSCH indexing for all PDSCHs scheduled by the same DCI, then followed by ascending CC order. In FIG. 9, two CCs are scheduled (denoted "CC1" and "CC2"), where CC1 is scheduled with 2 non-contiguous PDSCH transmissions in slot 1 and slot 3 and CC2 is scheduled with 2 contiguous PDSCH transmissions in slot 1 and slot 2. In the depicted embodiment, the PDSCH indexing and corresponding HARQ-ACK sequencing is done first in increasing time order of PDSCH transmissions scheduled by DCI on CC1 and then PDSCH indexing and corresponding HARQ-ACK sequencing is done first in increasing time order of PDSCH transmissions scheduled by DCI on CC2.

According to embodiments of a third solution, in order to avoid significant increase in the size of HARQ-ACK codebook for multiple PDSCH scheduling by single DCI. PDSCH grouping and/or time-domain HARQ-ACK bundling can be applied based on:

Option 1: Priority indicator, for example if the scheduled PDSCH transmissions are URLLC type (high-priority) or eMBB type (low-priority), then grouping is applied only when low priority traffic is scheduled, and no grouping is applied for high priority traffic. Basically, higher bundling size is applied for high-priority PDSCH in comparison to low-priority PDSCH. Alternatively, separate HARQ-ACK sub-codebook can be applied for DCI scheduling URLLC such as DCI 2_1 for which no bundling or lesser size bundling is applied in comparison to HARQ-ACK sub-codebook for low priority traffic scheduled. In another implementation, priority value in combination with the ascending order of the serving cells could be implemented thereby prioritizing the multiplexing in a separate HARQ-ACK codebook for high priority URLLC considering all serving cells. In another implementation. CBG based transmission with the ascending order of the serving cells could be implemented thereby multiplexing in a separate HARQ-ACK codebook for eMBB considering all serving cells.

Option 2: Number of TRPs over which multiple PDSCH transmissions are scheduled by DCI, for example, if 4 PDSCH transmissions are scheduled for TRP1 and 4 PDSCH transmissions are scheduled for TRP2, then two groups can be created, where group 1 is applied for TRP1 and group 2 is applied for TRP2. Based on this grouping, two separate HARQ-ACK sub-codebooks could be applied. Additionally, HARQ-ACK bundling could be applied for each of the group such that only 1 HARQ-ACK bit is generate for one group (for one Transport Block ("TB") per PDSCH transmission).

Option 3: SCS value and correspondingly allowed maximum number of PDSCH transmissions that can be scheduled by single DCI, for example if maximum 4 PDSCH transmissions can be scheduled by DCI for 480 kHz SCS and if maximum 8 PDSCH transmissions can be scheduled by DCI for 960 kHz SCS, then group size of 2 could be applied to 960 kHz SCS such that same size codebook is possible regardless of the SCS value (maximum number of PDSCH transmissions that can be scheduled by DCI).

Option 4: Any combination of Option 1, Option 2, and/or Option 3.

Figure 10:
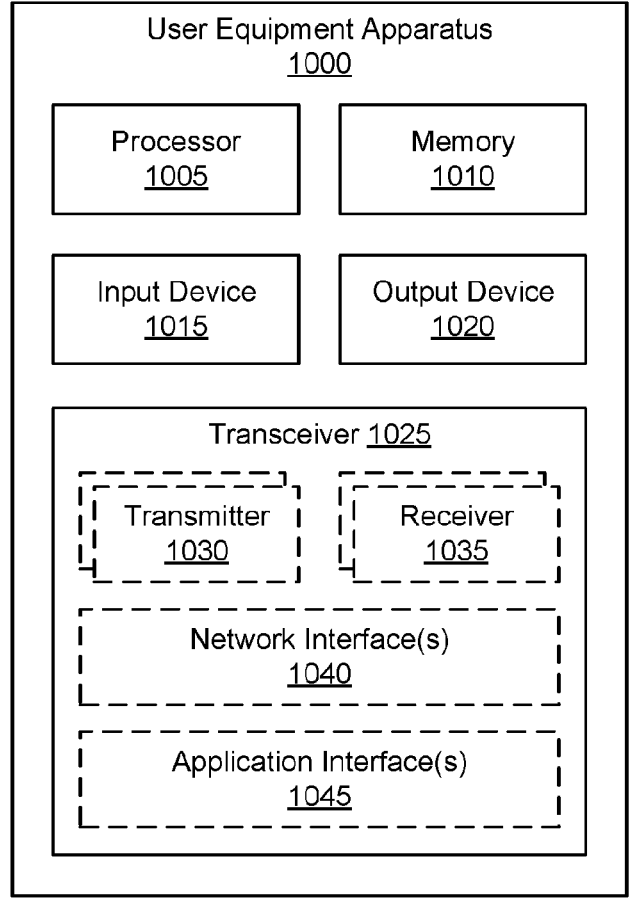
FIG. 10 is a block diagram illustrating one embodiment of a user equipment apparatus that may be used for constructing a dynamic HARQ-ACK codebook for multiple PDSCH.

FIG. 10 depicts a user equipment apparatus 1000 that may be used for constructing a dynamic HARQ-ACK codebook for multiple PDSCH, according to embodiments of the disclosure. In various embodiments, the user equipment apparatus 1000 is used to implement one or more of the solutions described above. The user equipment apparatus 1000 may be one embodiment of a UE endpoint, such as the remote unit 105 and/or the UE 205, as described above. Furthermore, the user equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the user equipment apparatus 1000 may not include any input device 1015 and/or output device 1020. In various embodiments, the user equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. In some embodiments, the transceiver 1025 communicates with one or more cells (or wireless coverage areas) supported by one or more base units 121. In various embodiments, the transceiver 1025 is operable on unlicensed spectrum. Moreover, the transceiver 1025 may include multiple UE panels supporting one or more beams. Additionally, the transceiver 1025 may support at least one network interface 1040 and/or application interface 1045. The application interface(s) 1045 may support one or more APIs. The network interface(s) 1040 may support 3GPP reference points, such as Uu, N1, PC5, etc. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the processor 1005 controls the user equipment apparatus 1000 to implement the above described UE behaviors. In certain embodiments, the processor 1005 may include an application processor (also known as "main processor") which manages application-domain and operating system ("OS") functions and a baseband processor (also known as "baseband radio processor") which manages radio functions.

In various embodiments, via the transceiver 1025, the processor 1005 monitors for and receives a first DCI that schedules at least one first PDSCH transmissions on a first serving cell, where the first DCI is capable of scheduling multiple PDSCH transmissions. Additionally, via the transceiver 1025, the processor 1005 monitors for and receives at least one second DCI that schedules at least one second PDSCH transmission on a second serving cell. Based on the received DCI, the processor 1005 attempts to receive the scheduled first and second PDSCH transmissions.

The processor 1005 determines HARQ-ACK feedback for the scheduled first and second PDSCH transmissions and determine a sequence of HARQ-ACK bits corresponding to the scheduled first and second PDSCH transmissions. Here, the determination is based on at least a serving cell index and an occurrence in time of the PDSCH. Via the transceiver 1025, the processor 1005 reports a HARQ-ACK codebook corresponding to the determined HARQ-ACK feedback, the HARQ-ACK codebook including HARQ-ACK bits according to the determined sequence.

In some embodiments, the sequence of HARQ-ACK bits includes a plurality of subsequences specific to each serving cell, each subsequence including a HARQ-ACK bit for each data unit of a PDSCH transmission in order of time of reception. In such embodiments, the plurality of subsequences is concatenated to form the sequence of HARQ-ACK bits. In certain embodiments, the plurality of subsequences is ordered from lowest serving cell index to highest serving cell index.

In some embodiments, the sequence of HARQ-ACK bits includes a plurality of subsequences specific to each slot on which at least one PDSCH transmission is received, each subsequence including a HARQ-ACK bit for each data unit of a PDSCH transmission in order of serving cell index. In such embodiments, the plurality of subsequences is concatenated to form the sequence of HARQ-ACK bits. In certain embodiments, the plurality of subsequences is ordered according to time of reception from earliest received data unit to last received data unit.

In some embodiments, the determination of the sequence of HARQ-ACK bits is further based on an occurrence in time of each DCI. In some embodiments, at least two PDSCH transmissions are scheduled (i.e., but not necessarily transmitted) for a same time (e.g., same slot or TTI) and same serving cell by two different DCI monitored in different times. In such embodiments, the sequence of HARQ-ACK bits first includes a bit for a PDSCH for which the corresponding DCI is received earlier in time and later includes a bit for a PDSCH for which the corresponding DCI is received later in time.

In some embodiments, the sequence of HARQ-ACK bits includes at least one negative acknowledgment for a combination of time slot and serving cell index for which no PDSCH transmission was scheduled by the first DCI nor by the second DCI. In certain embodiments, via the transceiver 1025, the processor 1005 receives a third DCI that schedules at least one third PDSCH transmission on the first serving cell, where the sequence of HARQ-ACK bits includes a negative acknowledgment bit for a specific time slot for which no PDSCH transmission was scheduled by the first DCI and an additional HARQ-ACK bit for the specific time slot (i.e., same time slot) for which a third PDSCH transmission was scheduled by the third DCI.

In some embodiments, the first DCI schedules a first number of (maximum) PDSCH transmissions and the second DCI schedules a second number of (maximum) PDSCH transmissions different than the first number. In such embodiments, the HARQ-ACK codebook includes a first sub-codebook corresponding to each serving cell scheduled with the first number of PDSCH transmissions and a second sub-codebook corresponding to each serving cell scheduled with the second number of PDSCH transmissions. In certain embodiments, the processor 1005 determines the sequence of the HARQ-ACK bits by determining the sequence of the HARQ-ACK bits includes determining a first sequence corresponding to the first sub-codebook and a second sequence corresponding to the second sub-codebook, where the first sequence is determined independently of the second sequence.

In some embodiments, the first serving cell is associated with a first subcarrier spacing value and the second serving cell is associated with a second subcarrier spacing value. In such embodiments, the HARQ-ACK codebook includes a first sub-codebook corresponding to each serving cell associated with the first subcarrier spacing value and a second sub-codebook corresponding to each serving cell associated with the second subcarrier spacing value. In certain embodiments, the processor 1005 determines the sequence of the HARQ-ACK bits by determining the sequence of the HARQ-ACK bits includes determining a first sequence corresponding to the first sub-codebook and a second sequence corresponding to the second sub-codebook, where the first sequence is determined independently of the second sequence.

In some embodiments, the HARQ-ACK codebook includes time-domain bundling of the HARQ-ACK bits of a serving cell, where two or more HARQ-ACK bits of the serving cell are bundled into a single HARQ-ACK bit. Here, the serving cell is the first serving cell or the second serving cell.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media. In some embodiments, the memory 1010 stores data related to constructing a dynamic HARQ-ACK codebook for multiple PDSCH. For example, the memory 1010 may store various parameters, panel/beam configurations, resource assignments, policies, and the like as described above. In certain embodiments, the memory 1010 also stores program code and related data, such as an operating system or other controller algorithms operating on the user equipment apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1020 may include a wearable display separate from, but communicatively coupled to, the rest of the user equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein. Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
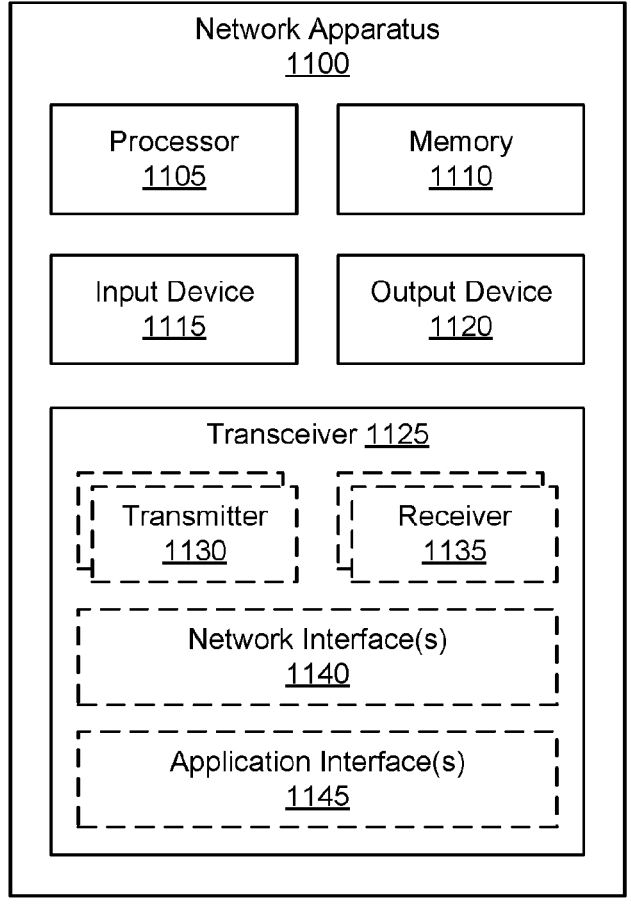
FIG. 11 is a block diagram illustrating one embodiment of a network apparatus that may be used for constructing a dynamic HARQ-ACK codebook for multiple PDSCH.

FIG. 11 depicts a network apparatus 1100 that may be used for constructing a dynamic HARQ-ACK codebook for multiple PDSCH, according to embodiments of the disclosure. In one embodiment, network apparatus 1100 may be one implementation of a network endpoint, such as the base unit 121 and/or RAN node 207, as described above. Furthermore, the network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 105. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the network apparatus 1100 is a RAN node (e.g., gNB) that communicates with one or more UEs, as described herein. In such embodiments, the processor 1105 controls the network apparatus 1100 to perform the above described RAN behaviors. In some embodiments, the network apparatus 1100 may configure one or more endpoint devices with the Training Sequences to be used in the key verification procedure. When operating as a RAN node, the processor 1105 may include an application processor (also known as "main processor") which manages application-domain and operating system ("OS") functions and a baseband processor (also known as "baseband radio processor") which manages radio functions.

In various embodiments, via the transceiver 1125, the processor 1105 transmits, to a UE, a first DCI that schedules at least one first PDSCH transmissions on a first serving cell, where the first DCI is capable of scheduling multiple PDSCH transmissions. Via the transceiver 1125, the processor 1105 transmits, to the UE, at least one second DCI that schedules at least one second PDSCH transmission on a second serving cell and also transmits, to the UE, the scheduled first and second PDSCH transmissions. The transceiver 1125 receives, from the UE, a HARQ-ACK codebook including a sequence of HARQ-ACK bits and the processor 1105 determines a sequence of the HARQ-ACK bits corresponding to the scheduled first and second PDSCH transmissions, where the determination is based on at least a serving cell index and an occurrence in time of the PDSCH. The processor 1105 determines HARQ-ACK feedback for the scheduled first and second PDSCH transmissions, e.g., based on the received HARQ-ACK bits and the determined sequence.

In some embodiments, the sequence of HARQ-ACK bits includes a plurality of subsequences specific to each serving cell, each subsequence including a HARQ-ACK bit for each data unit (e.g., TB or CBG) of a PDSCH transmission in order of time of reception (e.g., beginning with an earliest received data unit). In such embodiments, the plurality of subsequences is concatenated to form the sequence of HARQ-ACK bits. In certain embodiments, the plurality of subsequences is ordered from lowest serving cell index to highest serving cell index.

In some embodiments, the sequence of HARQ-ACK bits includes a plurality of subsequences specific to each slot on which at least one PDSCH transmission is received, each subsequence including a HARQ-ACK bit for each data unit (e.g., TB or CBG) of a PDSCH transmission in order of serving cell index (e.g., beginning with a lowest serving cell index). In such embodiments, the plurality of subsequences is concatenated to form the sequence of HARQ-ACK bits. In certain embodiments, the plurality of subsequences is ordered according to time of reception from earliest received data unit to last received data unit.

In some embodiments, the determination of the sequence of HARQ-ACK bits is further based on an occurrence in time of each DCI. In some embodiments, at least two PDSCH transmissions are scheduled (i.e., but not necessarily transmitted) for a same time (e.g., same slot and/or TTI) and same serving cell (e.g., same CC) by two different DCI monitored in different times. In such embodiments, the sequence of HARQ-ACK bits first includes a bit for a PDSCH for which the corresponding DCI is received earlier in time and later includes a bit for a PDSCH for which the corresponding DCI is received later in time.

In some embodiments, the sequence of HARQ-ACK bits includes at least one negative acknowledgment for a combination of time slot and serving cell index for which no PDSCH transmission was scheduled by the first DCI nor by the second DCI. In certain embodiments, the processor 1105 controls the transceiver 1125 to transmit a third DCI that schedules at least one third PDSCH transmission on the first serving cell. In such embodiments, the sequence of HARQ-ACK bits includes a negative acknowledgment bit for a specific time slot for which no PDSCH transmission was scheduled by the first DCI and an additional HARQ-ACK bit for the specific time slot (i.e., same time slot) for which a third PDSCH transmission was scheduled by the third DCI.

In some embodiments, the first DCI can schedule up to a first number of (maximum) PDSCH transmissions and the second DCI can schedule up to a second number of (maximum) PDSCH transmissions, the second number different than the first number. In such embodiments, the HARQ-ACK codebook includes a first sub-codebook corresponding to each serving cell that can be scheduled with the first number of PDSCH transmissions and a second sub-codebook corresponding to each serving cell that can be scheduled with the second number of PDSCH transmissions. In certain embodiments, the processor 1105 determines the sequence of the HARQ-ACK bits by determining a first sequence corresponding to the first sub-codebook and a second sequence corresponding to the second sub-codebook, where the first sequence is determined independently of the second sequence (i.e., by applying ordering/indexing rules without consideration of the PDSCH occurrence in time, the service cell index, etc. associated with the other sequence).

In some embodiments, the first serving cell is associated with a first subcarrier spacing value and the second serving cell is associated with a second subcarrier spacing value, where the HARQ-ACK codebook includes a first sub-codebook corresponding to each serving cell associated with the first subcarrier spacing value and a second sub-codebook corresponding to each serving cell associated with the second subcarrier spacing value. In certain embodiments, the processor 1105 determines the sequence of the HARQ-ACK bits by determining a first sequence corresponding to the first sub-codebook and a second sequence corresponding to the second sub-codebook, where the first sequence is determined independently of the second sequence (i.e., by applying ordering/indexing rules without consideration of the PDSCH occurrence in time, the service cell index, etc. associated with the other sequence).

In some embodiments, the HARQ-ACK codebook includes time-domain bundling of the HARQ-ACK bits of a serving cell, where two or more HARQ-ACK bits of the serving cell are bundled into a single HARQ-ACK bit. Here, the serving cell is the first serving cell or the second serving cell.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to constructing a dynamic HARQ-ACK codebook for multiple PDSCH. For example, the memory 1110 may store parameters, configurations, resource assignments, policies, and the like, as described above. In certain embodiments, the memory 1110 also stores program code and related data, such as an operating system or other controller algorithms operating on the network apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the Public Land Mobile Network ("PLMN") and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

FIG. 12 depicts one embodiment of a method 1200 for constructing a dynamic HARQ-ACK codebook for multiple PDSCH, according to embodiments of the disclosure. In various embodiments, the method 900 is performed by an endpoint device, such as a remote unit 105, a UE 205, and/or the user equipment apparatus 1000, as described above. In some embodiments, the method 1200 is performed by a processor, such as a microcontroller, a microprocessor, a CPU, a GPU, an auxiliary processing unit, a FPGA, or the like.

The method 1200 begins and receives 1205 a first DCI that schedules at least one first PDSCH transmissions on a first serving cell, where the first DCI is capable of scheduling multiple PDSCH transmissions. The method 1200 includes receiving 1210 at least one second DCI that schedules at least one second PDSCH transmission on a second serving cell. The method 1200 includes determining 1215 HARQ-ACK feedback for the scheduled first and second PDSCH transmissions. The method 1200 includes determining 1220 a sequence of the HARQ-ACK bits corresponding to the scheduled first and second PDSCH transmissions, where the sequence is determined based on at least a serving cell index and an occurrence in time of the PDSCH. The method 1200 includes reporting 1225 a HARQ-ACK codebook corresponding to the determined HARQ-ACK feedback, where the HARQ-ACK codebook including HARQ-ACK bits according to the determined sequence. The method 1200 ends.

Figure 13:
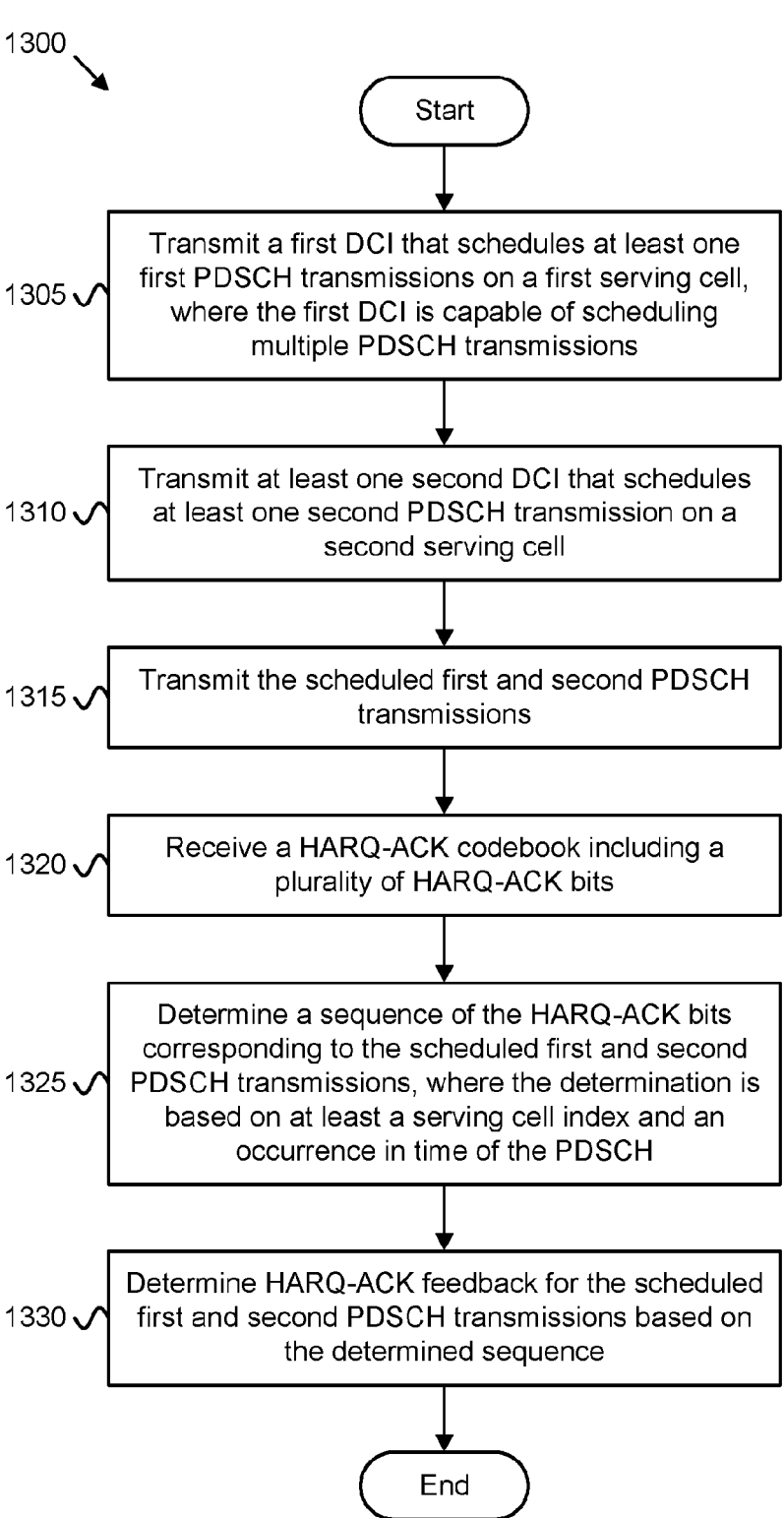
FIG. 13 is a flowchart diagram illustrating another embodiment of a method for constructing a dynamic HARQ-ACK codebook for multiple PDSCH.

FIG. 13 depicts one embodiment of a method 1300 for constructing a dynamic HARQ-ACK codebook for multiple PDSCH, according to embodiments of the disclosure. In various embodiments, the method 1300 is performed by a network device, such as a base unit 121, a RAN node 207, and/or the network apparatus 1100, as described above. In some embodiments, the method 1300 is performed by a processor, such as a microcontroller, a microprocessor, a CPU, a GPU, an auxiliary processing unit, a FPGA, or the like.

The method 1300 begins and transmits 1305 a first DCI that schedules at least one first PDSCH transmissions on a first serving cell, where the first DCI is capable of scheduling multiple PDSCH transmissions. The method 1300 includes transmitting 1310 at least one second DCI that schedules at least one second PDSCH transmission on a second serving cell. The method 1300 includes transmitting 1315 the scheduled first and second PDSCH transmissions. The method 1300 includes receiving 1320 a HARQ-ACK codebook including a plurality of HARQ-ACK bits. The method 1300 includes determining 1325 a sequence of the HARQ-ACK bits corresponding to the scheduled first and second PDSCH transmissions, where the determination is based on at least a serving cell index and an occurrence in time of the PDSCH. The method 1300 includes determining 1330 HARQ-ACK feedback for the scheduled first and second PDSCH transmissions based on the determined sequence. The method 1300 ends.

Disclosed herein is a first apparatus for constructing a dynamic HARQ-ACK codebook for multiple PDSCH, according to embodiments of the disclosure. The first apparatus may be implemented by an endpoint device, such as a remote unit 105, a UE 205, and/or the user equipment apparatus 1000, described above. The first apparatus includes a processor coupled to a transceiver, the transceiver configured to communicate with a mobile communication network and the processor configured to cause the first apparatus to: A) monitor and receive a first DCI that schedules at least one first PDSCH transmissions on a first serving cell, where the first DCI is capable of scheduling multiple PDSCH transmissions: B) monitor and receive at least one second DCI that schedules at least one second PDSCH transmission on a second serving cell: C) determine Hybrid Automatic Repeat Request Acknowledgement ("HARQ-ACK") feedback for the scheduled first and second PDSCH transmissions: D) determine a sequence of the HARQ-ACK bits corresponding to the scheduled first and second PDSCH transmissions, where the determination is based on at least a serving cell index and an occurrence in time of the PDSCH; and E) report a HARQ-ACK codebook corresponding to the determined HARQ-ACK feedback, the HARQ-ACK codebook including HARQ-ACK bits according to the determined sequence.

In some embodiments, the sequence of HARQ-ACK bits includes a plurality of subsequences specific to each serving cell, each subsequence including a HARQ-ACK bit for each data unit of a PDSCH transmission in order of time of reception. In such embodiments, the plurality of subsequences is concatenated to form the sequence of HARQ-ACK bits. In certain embodiments, the plurality of subsequences is ordered from lowest serving cell index to highest serving cell index.

In some embodiments, the sequence of HARQ-ACK bits includes a plurality of subsequences specific to each slot on which at least one PDSCH transmission is received, each subsequence including a HARQ-ACK bit for each data unit of a PDSCH transmission in order of serving cell index. In such embodiments, the plurality of subsequences is concatenated to form the sequence of HARQ-ACK bits. In certain embodiments, the plurality of subsequences is ordered according to time of reception from earliest received data unit to last received data unit.

In some embodiments, the determination of the sequence of HARQ-ACK bits is further based on an occurrence in time of each DCI. In some embodiments, at least two PDSCH transmissions are scheduled (i.e., but not necessarily transmitted) for a same time (e.g., same slot or TTI) and same serving cell by two different DCI monitored in different times. In such embodiments, the sequence of HARQ-ACK bits first includes a bit for a PDSCH for which the corresponding DCI is received earlier in time and later includes a bit for a PDSCH for which the corresponding DCI is received later in time.

In some embodiments, the sequence of HARQ-ACK bits includes at least one negative acknowledgment for a combination of time slot and serving cell index for which no PDSCH transmission was scheduled by the first DCI nor by the second DCI. In certain embodiments, the processor is further configured to cause the first apparatus to receive a third DCI that schedules at least one third PDSCH transmission on the first serving cell, where the sequence of HARQ-ACK bits includes a negative acknowledgment bit for a specific time slot for which no PDSCH transmission was scheduled by the first DCI and an additional HARQ-ACK bit for the specific time slot (i.e., same time slot) for which a third PDSCH transmission was scheduled by the third DCI.

In some embodiments, the first DCI schedules a first number of (maximum) PDSCH transmissions and the second DCI schedules a second number of (maximum) PDSCH transmissions different than the first number. In such embodiments, the HARQ-ACK codebook includes a first sub-codebook corresponding to each serving cell scheduled with the first number of PDSCH transmissions and a second sub-codebook corresponding to each serving cell scheduled with the second number of PDSCH transmissions. In certain embodiments, to determine the sequence of the HARQ-ACK bits, the processor is further configured to determine the sequence of the HARQ-ACK bits includes determining a first sequence corresponding to the first sub-codebook and a second sequence corresponding to the second sub-codebook, where the first sequence is determined independently of the second sequence.

In some embodiments, the first serving cell is associated with a first subcarrier spacing value and the second serving cell is associated with a second subcarrier spacing value. In such embodiments, the HARQ-ACK codebook includes a first sub-codebook corresponding to each serving cell associated with the first subcarrier spacing value and a second sub-codebook corresponding to each serving cell associated with the second subcarrier spacing value. In certain embodiments, to determine the sequence of the HARQ-ACK bits, the processor is further configured to determine the sequence of the HARQ-ACK bits includes determining a first sequence corresponding to the first sub-codebook and a second sequence corresponding to the second sub-codebook, where the first sequence is determined independently of the second sequence.

In some embodiments, the HARQ-ACK codebook includes time-domain bundling of the HARQ-ACK bits of a serving cell, where two or more HARQ-ACK bits of the serving cell are bundled into a single HARQ-ACK bit. Here, the serving cell is the first serving cell or the second serving cell.

Disclosed herein is a first method for constructing a dynamic HARQ-ACK codebook for multiple PDSCH, according to embodiments of the disclosure. The first method may be performed by an endpoint device, such as a remote unit 105, a UE 205, and/or the user equipment apparatus 1000, described above. The first method includes receiving a first DCI that schedules at least one first PDSCH transmissions on a first serving cell, where the first DCI is capable of scheduling multiple PDSCH transmissions. The first method includes receiving at least one second DCI that schedules at least one second PDSCH transmission on a second serving cell and determining HARQ-ACK feedback for the scheduled first and second PDSCH transmissions. The first method includes determining a sequence of the HARQ-ACK bits corresponding to the scheduled first and second PDSCH transmissions and reporting a HARQ-ACK codebook corresponding to the determined HARQ-ACK feedback, where the HARQ-ACK codebook including HARQ-ACK bits according to the determined sequence and the sequence is determined based on at least a serving cell index and an occurrence in time of the PDSCH.

In some embodiments, the sequence of HARQ-ACK bits includes a plurality of subsequences specific to each serving cell, each subsequence including a HARQ-ACK bit for each data unit of a PDSCH transmission in order of time of reception. In such embodiments, the plurality of subsequences is concatenated to form the sequence of HARQ-ACK bits. In certain embodiments, the plurality of subsequences is ordered from lowest serving cell index to highest serving cell index.

In some embodiments, the sequence of HARQ-ACK bits includes a plurality of subsequences specific to each slot on which at least one PDSCH transmission is received, each subsequence including a HARQ-ACK bit for each data unit of a PDSCH transmission in order of serving cell index. In such embodiments, the plurality of subsequences is concatenated to form the sequence of HARQ-ACK bits. In certain embodiments, the plurality of subsequences is ordered according to time of reception from earliest received data unit to last received data unit.

In some embodiments, the determination of the sequence of HARQ-ACK bits is further based on an occurrence in time of each DCI. In some embodiments, at least two PDSCH transmissions are scheduled (i.e., but not necessarily transmitted) for a same time (e.g., same slot or TTI) and same serving cell by two different DCI monitored in different times. In such embodiments, the sequence of HARQ-ACK bits first includes a bit for a PDSCH for which the corresponding DCI is received earlier in time and later includes a bit for a PDSCH for which the corresponding DCI is received later in time.

In some embodiments, the sequence of HARQ-ACK bits includes at least one negative acknowledgment for a combination of time slot and serving cell index for which no PDSCH transmission was scheduled by the first DCI nor by the second DCI. In certain embodiments, the first method further includes receiving a third DCI that schedules at least one third PDSCH transmission on the first serving cell, where the sequence of HARQ-ACK bits includes a negative acknowledgment bit for a specific time slot for which no PDSCH transmission was scheduled by the first DCI and an additional HARQ-ACK bit for the specific time slot (i.e., same time slot) for which a third PDSCH transmission was scheduled by the third DCI.

In some embodiments, the first DCI schedules a first number of (maximum) PDSCH transmissions and the second DCI schedules a second number of (maximum) PDSCH transmissions different than the first number. In such embodiments, the HARQ-ACK codebook includes a first sub-codebook corresponding to each serving cell scheduled with the first number of PDSCH transmissions and a second sub-codebook corresponding to each serving cell scheduled with the second number of PDSCH transmissions. In certain embodiments, determining the sequence of the HARQ-ACK bits includes determining a first sequence corresponding to the first sub-codebook and a second sequence corresponding to the second sub-codebook, where the first sequence is determined independently of the second sequence.

In some embodiments, the first serving cell is associated with a first subcarrier spacing value and the second serving cell is associated with a second subcarrier spacing value. In such embodiments, the HARQ-ACK codebook includes a first sub-codebook corresponding to each serving cell associated with the first subcarrier spacing value and a second sub-codebook corresponding to each serving cell associated with the second subcarrier spacing value. In certain embodiments, determining the sequence of the HARQ-ACK bits includes determining a first sequence corresponding to the first sub-codebook and a second sequence corresponding to the second sub-codebook, where the first sequence is determined independently of the second sequence.

In some embodiments, the HARQ-ACK codebook includes time-domain bundling of the HARQ-ACK bits of a serving cell, where two or more HARQ-ACK bits of the serving cell are bundled into a single HARQ-ACK bit. Here, the serving cell is the first serving cell or the second serving cell.

Disclosed herein is a second apparatus for constructing a dynamic HARQ-ACK codebook for multiple PDSCH, according to embodiments of the disclosure. The second apparatus may be implemented by a network device, such as a base unit 121, a RAN node 207, and/or the network apparatus 1100, described above. The second apparatus includes a processor coupled to a transceiver, the transceiver configured to communicate with a UE and the processor configured to cause the second apparatus to: A) transmit, to the UE, a first DCI that schedules at least one first PDSCH transmissions on a first serving cell, where the first DCI is capable of scheduling multiple PDSCH transmissions: B) transmit, to the UE, at least one second DCI that schedules at least one second PDSCH transmission on a second serving cell: C) transmit, to the UE, the scheduled first and second PDSCH transmissions: D) receive, from the UE, a HARQ-ACK codebook including a plurality of HARQ-ACK bits: E) determine a sequence of the HARQ-ACK bits corresponding to the scheduled first and second PDSCH transmissions, where the determination is based on at least a serving cell index and an occurrence in time of the PDSCH: and F) determine HARQ-ACK feedback for the scheduled first and second PDSCH transmissions based on the determined sequence.

In some embodiments, the sequence of HARQ-ACK bits includes a plurality of subsequences specific to each serving cell, each subsequence including a HARQ-ACK bit for each data unit of a PDSCH transmission in order of time of reception. In such embodiments, the plurality of subsequences is concatenated to form the sequence of HARQ-ACK bits. In certain embodiments, the plurality of subsequences is ordered from lowest serving cell index to highest serving cell index.

In some embodiments, the sequence of HARQ-ACK bits includes a plurality of subsequences specific to each slot on which at least one PDSCH transmission is received, each subsequence including a HARQ-ACK bit for each data unit of a PDSCH transmission in order of serving cell index. In such embodiments, the plurality of subsequences is concatenated to form the sequence of HARQ-ACK bits. In certain embodiments, the plurality of subsequences is ordered according to time of reception from earliest received data unit to last received data unit.

In some embodiments, the determination of the sequence of HARQ-ACK bits is further based on an occurrence in time of each DCI. In some embodiments, at least two PDSCH transmissions are scheduled (i.e., but not necessarily transmitted) for a same time (e.g., same slot and/or TTI) and same serving cell (e.g., same CC) by two different DCI monitored in different times. In such embodiments, the sequence of HARQ-ACK bits first includes a bit for a PDSCH for which the corresponding DCI is received earlier in time and later includes a bit for a PDSCH for which the corresponding DCI is received later in time.

In some embodiments, the sequence of HARQ-ACK bits includes at least one negative acknowledgment for a combination of time slot and serving cell index for which no PDSCH transmission was scheduled by the first DCI nor by the second DCI. In certain embodiments, the processor is further configured to cause the second apparatus to transmit a third DCI that schedules at least one third PDSCH transmission on the first serving cell. In such embodiments, the sequence of HARQ-ACK bits includes a negative acknowledgment bit for a specific time slot for which no PDSCH transmission was scheduled by the first DCI and an additional HARQ-ACK bit for the specific time slot (i.e., same time slot) for which a third PDSCH transmission was scheduled by the third DCI.

In some embodiments, the first DCI schedules a first number of (maximum) PDSCH transmissions and the second DCI schedules a second number of (maximum) PDSCH transmissions different than the first number. In such embodiments, the HARQ-ACK codebook includes a first sub-codebook corresponding to each serving cell scheduled with the first number of PDSCH transmissions and a second sub-codebook corresponding to each serving cell scheduled with the second number of PDSCH transmissions. In certain embodiments, to determine the sequence of the HARQ-ACK bits, the processor is further configured to determine the sequence of the HARQ-ACK bits includes determining a first sequence corresponding to the first sub-codebook and a second sequence corresponding to the second sub-codebook, where the first sequence is determined independently of the second sequence.

In some embodiments, the first serving cell is associated with a first subcarrier spacing value and the second serving cell is associated with a second subcarrier spacing value, where the HARQ-ACK codebook includes a first sub-codebook corresponding to each serving cell associated with the first subcarrier spacing value and a second sub-codebook corresponding to each serving cell associated with the second subcarrier spacing value. In certain embodiments, to determine the sequence of the HARQ-ACK bits, the processor is further configured to determine the sequence of the HARQ-ACK bits includes determining a first sequence corresponding to the first sub-codebook and a second sequence corresponding to the second sub-codebook, where the first sequence is determined independently of the second sequence.

In some embodiments, the HARQ-ACK codebook includes time-domain bundling of the HARQ-ACK bits of a serving cell, where two or more HARQ-ACK bits of the serving cell are bundled into a single HARQ-ACK bit. Here, the serving cell is the first serving cell or the second serving cell.

Disclosed herein is a second method for constructing a dynamic HARQ-ACK codebook for multiple PDSCH, according to embodiments of the disclosure. The second method may be performed by a network device, such as a base unit 121, a RAN node 207, and/or the network apparatus 1100, described above. The second method includes transmitting a first DCI that schedules at least one first PDSCH transmissions on a first serving cell, where the first DCI is capable of scheduling multiple PDSCH transmissions. The second method includes transmitting at least one second DCI that schedules at least one second PDSCH transmission on a second serving cell and transmitting the scheduled first and second PDSCH transmissions. The second method includes receiving a HARQ-ACK codebook including a plurality of HARQ-ACK bits and determining a sequence of the HARQ-ACK bits corresponding to the scheduled first and second PDSCH transmissions, where the determination is based on at least a serving cell index and an occurrence in time of the PDSCH. The second method includes determining HARQ-ACK feedback for the scheduled first and second PDSCH transmissions based on the determined sequence of.

In some embodiments, the sequence of HARQ-ACK bits includes a plurality of subsequences specific to each serving cell, each subsequence including a HARQ-ACK bit for each data unit of a PDSCH transmission in order of time of reception. In such embodiments, the plurality of subsequences is concatenated to form the sequence of HARQ-ACK bits. In certain embodiments, the plurality of subsequences is ordered from lowest serving cell index to highest serving cell index.

In some embodiments, the sequence of HARQ-ACK bits includes a plurality of subsequences specific to each slot on which at least one PDSCH transmission is received, each subsequence including a HARQ-ACK bit for each data unit of a PDSCH transmission in order of serving cell index. In such embodiments, the plurality of subsequences is concatenated to form the sequence of HARQ-ACK bits. In certain embodiments, the plurality of subsequences is ordered according to time of reception from earliest received data unit to last received data unit.

In some embodiments, the determination of the sequence of HARQ-ACK bits is further based on an occurrence in time of each DCI. In some embodiments, at least two PDSCH transmissions are scheduled (i.e., but not necessarily transmitted) for a same time (e.g., same slot and/or TTI) and same serving cell (e.g., same CC) by two different DCI monitored in different times. In such embodiments, the sequence of HARQ-ACK bits first includes a bit for a PDSCH for which the corresponding DCI is received earlier in time and later includes a bit for a PDSCH for which the corresponding DCI is received later in time.

In some embodiments, the sequence of HARQ-ACK bits includes at least one negative acknowledgment for a combination of time slot and serving cell index for which no PDSCH transmission was scheduled by the first DCI nor by the second DCI. In certain embodiments, the second method includes transmitting a third DCI that schedules at least one third PDSCH transmission on the first serving cell. In such embodiments, the sequence of HARQ-ACK bits includes a negative acknowledgment bit for a specific time slot for which no PDSCH transmission was scheduled by the first DCI and an additional HARQ-ACK bit for the specific time slot (i.e., same time slot) for which a third PDSCH transmission was scheduled by the third DCI.

In some embodiments, the first DCI schedules a first number of (maximum) PDSCH transmissions and the second DCI schedules a second number of (maximum) PDSCH transmissions different than the first number. In such embodiments, the HARQ-ACK codebook includes a first sub-codebook corresponding to each serving cell scheduled with the first number of PDSCH transmissions and a second sub-codebook corresponding to each serving cell scheduled with the second number of PDSCH transmissions. In certain embodiments, determining the sequence of the HARQ-ACK bits includes determining a first sequence corresponding to the first sub-codebook and a second sequence corresponding to the second sub-codebook, where the first sequence is determined independently of the second sequence.

In some embodiments, the first serving cell is associated with a first subcarrier spacing value and the second serving cell is associated with a second subcarrier spacing value, where the HARQ-ACK codebook includes a first sub-codebook corresponding to each serving cell associated with the first subcarrier spacing value and a second sub-codebook corresponding to each serving cell associated with the second subcarrier spacing value. In certain embodiments, determining the sequence of the HARQ-ACK bits includes determining a first sequence corresponding to the first sub-codebook and a second sequence corresponding to the second sub-codebook, where the first sequence is determined independently of the second sequence.

In some embodiments, the HARQ-ACK codebook includes time-domain bundling of the HARQ-ACK bits of a serving cell, where two or more HARQ-ACK bits of the serving cell are bundled into a single HARQ-ACK bit. Here, the serving cell is the first serving cell or the second serving cell.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication comprising:
    at least one memory; and
    at least one processor coupled with the memory and configured to cause the UE to:
        receive downlink control information (DCI) for scheduling a plurality of downlink transmissions on a plurality of serving cells, wherein downlink transmissions scheduled on a respective serving cell include a set of downlink transmissions scheduled by a single DCI;
        determine Hybrid Automatic Repeat Request Acknowledgement (HARQ-ACK) feedback for the plurality of downlink transmissions;
        determine a sequence of HARQ-ACK bits corresponding to the HARQ-ACK feedback, wherein the sequence of HARQ-ACK bits is ordered based at least in part on a serving cell index and an occurrence in time of a respective DCI corresponding to the plurality of downlink transmissions; and
        transmit the sequence of HARQ-ACK bits.

2. The UE of claim 1, wherein the sequence of HARQ-ACK bits comprises a plurality of subsequences specific to each serving cell of the plurality of serving cells, and wherein each subsequence of the plurality of subsequences comprises a respective HARQ-ACK bit for a corresponding data unit of the plurality of downlink transmissions in order of time of reception.

3. The UE of claim 2, wherein the plurality of subsequences is ordered from a lowest serving cell index to a highest serving cell index, and wherein the at least one processor is configured to cause the UE to concatenate the ordered plurality of subsequences to form the sequence of HARQ-ACK bits.

4. The UE of claim 1, wherein the sequence of HARQ-ACK bits comprises a plurality of subsequences specific to each slot on which at least one downlink transmission is received, and wherein each subsequence of the plurality of subsequences comprises a respective HARQ-ACK bit for a corresponding data unit of the plurality of downlink transmissions in order of serving cell index.

5. The UE of claim 4, wherein the plurality of subsequences is ordered according to time of reception from earliest received data unit to last received data unit, and wherein the at least one processor is configured to cause the UE to concatenate the ordered plurality of subsequences to form the sequence of HARQ-ACK bits.

6. The UE of claim 1, wherein the plurality of downlink transmissions comprises a plurality of physical downlink shared channel (PDSCH) transmissions, and wherein the sequence of HARQ-ACK bits comprises at least one negative acknowledgment for a combination of time slot and serving cell index for which no PDSCH transmission was scheduled by the DCI.

7. The UE of claim 1, wherein the received DCI comprises at least a first DCI for scheduling a first number of physical downlink shared channel (PDSCH) transmissions and a second DCI for scheduling a second number of PDSCH transmissions different than the first number, and wherein the sequence of HARQ-ACK bits comprises a first subsequence corresponding to each serving cell scheduled with the first number of PDSCH transmissions and a second subsequence corresponding to each serving cell scheduled with the second number of PDSCH transmissions.

8. The UE of claim 7, wherein to determine the sequence of the HARQ-ACK bits, the at least one processor is configured to cause the UE to determine the first subsequence independently of the second subsequence.

9. The UE of claim 1, wherein the plurality of serving cells comprises a first serving cell associated with a first subcarrier spacing value and a second serving cell associated with a second subcarrier spacing value, and wherein the sequence of HARQ-ACK bits comprises a first subsequence corresponding to each serving cell associated with the first subcarrier spacing value and a second subsequence corresponding to each serving cell associated with the second subcarrier spacing value.

10. A processor for wireless communication, comprising:
    at least one controller coupled with at least one memory and configured to cause the processor to:
        receive downlink control information (DCI) for scheduling a plurality of downlink transmissions on a plurality of serving cells, wherein downlink transmissions scheduled on a respective serving cell include a set of downlink transmissions scheduled by a single DCI;
        determine Hybrid Automatic Repeat Request Acknowledgement (HARQ-ACK) feedback for the plurality of downlink transmissions;
        determine a sequence of HARQ-ACK bits corresponding to the HARQ-ACK feedback, wherein the sequence of HARQ-ACK bits is ordered based at least in part on a serving cell index and an occurrence in time of a respective DCI corresponding to the plurality of downlink transmissions; and transmit the sequence of HARQ-ACK bits.

11. A base station for wireless communication, comprising:

at least one memory; and at least one processor coupled with the at least one memory and configured to cause the base station to:

transmit, to a user equipment (UE), downlink control information (DCI) for scheduling a plurality of downlink transmissions on a plurality of serving cells, wherein downlink transmissions scheduled on a respective serving cell include a set of downlink transmissions scheduled by a single DCI;

receive, from the UE, a plurality of Hybrid Automatic Repeat Request Acknowledgement (HARQ-ACK) bits;

determine a sequence of the plurality HARQ-ACK bits, wherein the sequence of HARQ-ACK bits is ordered based at least in part on a serving cell index and an occurrence in time of an associated DCI; and determine HARQ-ACK feedback corresponding to the plurality of downlink transmissions based at least in part on the determined sequence.

12. The base station of claim 11, wherein the sequence of HARQ-ACK bits comprises a plurality of subsequences specific to each serving cell of the plurality of serving cells, and wherein each subsequence of the plurality of subsequences comprises a respective HARQ-ACK bit for a corresponding data unit of the plurality of downlink transmissions in order of time of reception.

13. The base station of claim 12, wherein the plurality of subsequences is ordered from a lowest serving cell index to a highest serving cell index, and wherein the ordered plurality of subsequences is concatenated to form the sequence of HARQ-ACK bits.

14. The base station of claim 11, wherein the sequence of HARQ-ACK bits comprises a plurality of subsequences specific to each slot on which at least one downlink transmission is scheduled, and wherein each subsequence of the plurality of subsequences comprises a respective HARQ-ACK bit for a corresponding data unit of the plurality of downlink transmissions in order of serving cell index.

15. The base station of claim 14, wherein the plurality of subsequences is ordered according to time of reception from an earliest received data unit to a last received data unit, and wherein the ordered plurality of subsequences is concatenated to form the sequence of HARQ-ACK bits.

16. The base station of claim 11, wherein the plurality of downlink transmissions comprises a plurality of physical downlink shared channel (PDSCH) transmissions, and wherein the sequence of HARQ-ACK bits comprises at least one negative acknowledgment for a combination of time slot and serving cell index for which no PDSCH transmission was scheduled by the DCI.

17. The base station of claim 11, wherein the transmitted DCI comprises at least a first DCI for scheduling a first number of physical downlink shared channel (PDSCH) transmissions and a second DCI for scheduling a second number of PDSCH transmissions different than the first number, and wherein the sequence of HARQ-ACK bits comprises a first subsequence corresponding to each serving cell scheduled with the first number of PDSCH transmissions and a second subsequence corresponding to each serving cell scheduled with the second number of PDSCH transmissions.

18. The base station of claim 17, wherein to determine the sequence of the HARQ-ACK bits, the at least one processor is configured to cause the base station to determine the first subsequence independently of the second subsequence.

19. The base station of claim 11, wherein the plurality of serving cells comprises a first serving cell associated with a first subcarrier spacing value and a second serving cell associated with a second subcarrier spacing value, and wherein the sequence of HARQ-ACK bits comprises a first subsequence corresponding to each serving cell associated with the first subcarrier spacing value and a second subsequence corresponding to each serving cell associated with the second subcarrier spacing value.

20. A method performed by a base station, the method comprising:

transmitting, to a user equipment (UE), downlink control information (DCI) for scheduling a plurality of downlink transmissions on a plurality of serving cells, wherein downlink transmissions scheduled on a respective serving cell include a set of downlink transmissions scheduled by a single DCI;

receiving, from the UE, a plurality of Hybrid Automatic Repeat Request Acknowledgement (HARQ-ACK) bits;

determining a sequence of the plurality HARQ-ACK bits, wherein the sequence of HARQ-ACK bits is ordered based at least in part on a serving cell index and an occurrence in time of an associated DCI; and determining HARQ-ACK feedback corresponding to the plurality of downlink transmissions based at least in part on the determined sequence.

* * * * *